(12) United States Patent
Zhang et al.

(10) Patent No.: US 11,680,716 B2
(45) Date of Patent: Jun. 20, 2023

(54) WINDOW AIR CONDITIONER SEALING DEVICE

(71) Applicants: GD MIDEA AIR-CONDITIONING EQUIPMENT CO., LTD., Foshan (CN); MIDEA GROUP CO., LTD., Foshan (CN)

(72) Inventors: Kangwen Zhang, Foshan (CN); Hui Yu, Foshan (CN); Yu Liu, Foshan (CN); Zhigang Xing, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 55 days.

(21) Appl. No.: 16/498,165

(22) PCT Filed: Aug. 8, 2019

(86) PCT No.: PCT/CN2019/099848
§ 371 (c)(1),
(2) Date: Sep. 26, 2019

(87) PCT Pub. No.: WO2020/038239
PCT Pub. Date: Feb. 27, 2020

(65) Prior Publication Data
US 2021/0356146 A1 Nov. 18, 2021

(30) Foreign Application Priority Data

Aug. 21, 2018 (CN) .......................... 201810956185.1
Aug. 21, 2018 (CN) .......................... 201810956881.2
(Continued)

(51) Int. Cl.
*F24F 1/031* (2019.01)
*F16J 15/06* (2006.01)
(Continued)

(52) U.S. Cl.
CPC ............. *F24F 1/031* (2019.02); *F16J 15/062* (2013.01); *F24F 1/027* (2013.01); *F24F 13/32* (2013.01)

(58) Field of Classification Search
CPC .. F24F 1/031; F24F 1/027; F24F 13/20; F24F 13/32; F24F 1/02; F16J 15/062;
(Continued)

(56) References Cited

U.S. PATENT DOCUMENTS 1,954,017 A * 4/1934 Manning ................... F24F 1/04
160/43
2,604,763 A * 7/1952 Lipman ................... F24F 1/027
62/262
(Continued)

FOREIGN PATENT DOCUMENTS

CA       3057095 A1   2/2020
CN       2444166 Y    8/2001
(Continued)

OTHER PUBLICATIONS

The State Intellectual Property Office of PRC (SIPO) The Second Office Action For CN Application No. 201810956881.2 dated Jun. 12, 2020 15 Pages (Translation Included).
(Continued)

*Primary Examiner* — Edelmira Bosques
*Assistant Examiner* — Frances F. Hamilton
(74) *Attorney, Agent, or Firm* — Anova Law Group PLLC

(57) ABSTRACT

A window air conditioner includes a casing including a cabinet. The cabinet includes a receiving groove formed at an outer peripheral wall of the cabinet. The receiving groove is recessed downwards to separate the cabinet into an indoor part and an outdoor part. The window air conditioner further includes an indoor heat exchanger and an indoor fan
(Continued)

arranged in the indoor part, and an outdoor heat exchanger and a compressor arranged in the outdoor part.

20 Claims, 20 Drawing Sheets

(30) Foreign Application Priority Data

Aug. 21, 2018 (CN) .................. 201821354639.X
Aug. 21, 2018 (CN) .................. 201821354663.3
Aug. 21, 2018 (CN) .................. 201821354665.2

(51) Int. Cl.
   *F24F 1/027* (2019.01)
   *F24F 13/32* (2006.01)

(58) Field of Classification Search
   CPC ......... F16J 15/061; F16B 5/121; F16B 7/105; F16B 21/073
   USPC ........................................... 62/285; 454/210
   See application file for complete search history.

(56) References Cited

U.S. PATENT DOCUMENTS

| | | | | | |
|---|---|---|---|---|---|
| 2,925,026 | A | * | 2/1960 | Schuster | F24F 1/04 454/203 |
| 3,271,972 | A | * | 9/1966 | Knight | F24F 1/04 62/262 |
| 3,296,820 | A | * | 1/1967 | Bauman | F24F 1/0057 62/262 |
| 3,309,889 | A | * | 3/1967 | Copp, Jr. | F24F 1/031 62/262 |
| 3,372,557 | A | * | 3/1968 | Dyas | F24F 13/20 62/262 |
| 3,392,546 | A | * | 7/1968 | Reed | F24F 7/013 62/262 |
| 3,911,803 | A | * | 10/1975 | Kong | E06B 7/03 62/262 |
| 5,167,131 | A | * | 12/1992 | Karkhanis | F24F 1/027 62/262 |
| 5,253,485 | A | * | 10/1993 | Kennedy | F24F 1/027 62/262 |
| 2003/0097854 | A1 | * | 5/2003 | Cur | F24F 1/027 62/262 |
| 2007/0023592 | A1 | * | 2/2007 | Makoso | E06B 7/28 248/200.1 |
| 2007/0137237 | A1 | * | 6/2007 | Rais | F24F 1/027 62/262 |
| 2014/0020421 | A1 | * | 1/2014 | Gallo | B23P 11/00 62/263 |
| 2017/0191679 | A1 | | 7/2017 | Xu et al. | |
| 2019/0212028 | A1 | * | 7/2019 | Zemborain | F24F 13/18 |
| 2020/0248911 | A1 | | 8/2020 | Lei et al. | |
| 2021/0088251 | A1 | * | 3/2021 | Martinez Galvan | F24F 1/027 |
| 2021/0356145 | A1 | * | 11/2021 | Lei | F24F 1/0323 |

FOREIGN PATENT DOCUMENTS

| CN | 2622607 Y | 6/2004 |
|---|---|---|
| CN | 102455025 A | 5/2012 |
| CN | 105465905 A | 4/2016 |
| CN | 105485786 A | 4/2016 |
| CN | 205618492 U | 10/2016 |
| CN | 106969481 A | 7/2017 |
| CN | 107289602 A | 10/2017 |
| CN | 206648183 U | 11/2017 |
| CN | 206648197 U | 11/2017 |
| CN | 206959272 U | 2/2018 |
| CN | 207132495 U | 3/2018 |
| CN | 107940724 A | 4/2018 |
| CN | 207471698 U | 6/2018 |
| CN | 108870565 A | 11/2018 |
| CN | 109184456 A | 1/2019 |
| CN | 208671189 U | 3/2019 |
| CN | 208671286 U | 3/2019 |
| CN | 109724163 A | 5/2019 |
| CN | 109724167 A | 5/2019 |
| CN | 109724168 A | 5/2019 |
| CN | 109724169 A | 5/2019 |
| CN | 109724170 A | 5/2019 |
| CN | 109724171 A | 5/2019 |
| CN | 109724172 A | 5/2019 |
| CN | 208920420 U | 5/2019 |
| CN | 109959079 A | 7/2019 |
| CN | 109974128 A | 7/2019 |
| EP | 3228948 A1 | 10/2017 |
| JP | S5816135 A | 1/1983 |
| JP | S611935 A | 1/1986 |
| WO | 2020037956 A1 | 2/2020 |
| WO | 2020038239 A1 | 2/2020 |
| WO | 2020155353 A1 | 8/2020 |
| WO | 2020155625 A1 | 8/2020 |

OTHER PUBLICATIONS

The State Intellectual Property Office of PRC (SIPO) The First Office Action For CN Application No. 201810956185.1 dated Apr. 2, 2020 14 Pages (Translation Included ).
The State Intellectual Property Office of PRC (SIPO) The First Office Action For CN Application No. 202010605975.2 dated Mar. 18, 2021 13 Pages (Translation Included ).
Canadian Intellectual Property Office The Office Action For CA Application No. 3057095 dated Feb. 2, 2021 5 Pages.
World Intellectual Property Organization (WIPO) International Search Report for PCT/CN2019/074105 dated May 17, 2019 20 Pages(Translation Included).
World Intellectual Property Organization (WIPO) International Search Report for PCT/CN2019/099848 dated Nov. 1, 2019 24 Pages(Translation Included ).
The State Intellectual Property Office of PRC (SIPO) The First Office Action For CN Application No. 201810956881.2 dated Sep. 23, 2019 17 Pages (Translation Included ).
World Intellectual Property Organization (WIPO) Written Opinion for PCT/CN2019/074105 dated May 17, 2019 10 Pages(Translation Included).
World Intellectual Property Organization (WIPO) Written Opinion for PCT/CN2019/099848 dated Nov. 1, 2019 10 Pages(Translation Included ).
Canadian Intellectual Property Office The Office Action For CA Application No. 3057119 dated Jan. 28, 2021 5 Pages.
Canadian Intellectual Property Office The Office Action For CA Application No. 3065409 dated Feb. 26, 2021 5 Pages.
The State Intellectual Property Office of PRC (SIPO) The Second Office Action For CN Application No. 201810956185.1 dated Nov. 11, 2020 24 Pages (Translation Included ).

* cited by examiner

WINDOW AIR CONDITIONER SEALING DEVICE

CROSS-REFERENCE TO RELATED APPLICATIONS

This application is a National Stage Entry under 35 U.S.C. § 371 of International Application No. PCT/CN2019/099848, filed on Aug. 8, 2019, which is based on and claims priority to Chinese Patent Application Nos. 201810956185.1, 201821354665.2, 201821354663.3, 201810956881.2, 201821354639.X, filed on Aug. 21, 2018, the entire contents of all of which are incorporated herein by reference.

FIELD

The present disclosure relates to a field of air conditioning, and more particularly to a window air conditioner.

BACKGROUND

In the related art, a window air conditioner is mounted in a window opening of a wall. Since an assembling gap exists between the window air conditioner and an inner wall of the window opening, a foldable louver is used to seal the assembling gap for improving a cooling effect of the window air conditioner. However, in order to meet a requirement of being foldable, a thickness of the louver is thin and a thermal insulation effect thereof is not good. Moreover, a fit structure between the louver and the window air conditioner has a poor sealing effect, and thus the window air conditioner tends to have a cold air leakage, thereby affecting the cooling and heating efficiencies of the window air conditioner.

SUMMARY

The present disclosure seeks to solve at least one of the technical problems existing in the related art. Hence, an objective of the present disclosure is to propose a window air conditioner, which has advantages of a convenient operation and a good sealing effect.

According to some embodiments of the present disclosure, the window air conditioner is mounted in a window opening of a wall and a movable window sash is provided in the window opening. The window air conditioner includes: a casing including a cabinet and a chassis, an outer peripheral wall of the cabinet being provided with a receiving groove recessed downwards so as to separate the cabinet into an indoor part and an outdoor part, at least a part of the window sash extending into the receiving groove, the chassis being disposed at a bottom of the cabinet and arranged at the wall; an indoor heat exchanger and an indoor fan arranged in the indoor part; an outdoor heat exchanger and a compressor arranged in the outdoor part, respectively.

In the window air conditioner according to embodiments of the present disclosure, with the receiving groove in the casing, the window sash may be extended into the receiving groove of the cabinet when moving downwards, such that the window sash may have a certain fixing to the mounting of the window air conditioner, and also have a certain sound insulation effect, thus reducing noises transmitted from the outdoor part to the indoor part.

According to some embodiments of the present disclosure, the window air conditioner further includes a sealing device connected with the casing and arranged corresponding to the receiving groove, the sealing device has a sealed state, and in the sealed state, at least a part of the sealing device is arranged outside the casing and contacts with a lower end of the window sash to seal a gap between the window sash and the window opening.

According to some embodiments of the present disclosure, the sealing device further has a retracted state, and in the retracted state, the sealing device is received in the casing.

According to some embodiments of the present disclosure, a connecting end of the sealing device is rotatably connected with the casing.

According to some embodiments of the present disclosure, the casing is provided with a rotating shaft, the connecting end of the sealing device is provided with a hook, the hook is hooked on the rotating shaft, and the sealing device is configured to rotate relative to the rotating shaft.

According to some embodiments of the present disclosure, a bottom wall of the receiving groove is provided with an assembling slot recessed downwards, and the rotating shaft is arranged in the assembling slot.

According to some embodiments of the present disclosure, the outer peripheral wall of the chassis is provided with a recessed part, the connecting end of the sealing device is provided with an assembling opening, and in the sealed state, a part of the chassis is extended into the assembling opening such that an outer peripheral wall of the recessed part is fitted with an inner peripheral wall of the assembling opening.

According to some embodiments of the present disclosure, a plurality of accommodating grooves are formed in a side wall of the chassis, and in the retracted state, the sealing device is received in one of the accommodating grooves.

According to some embodiments of the present disclosure, the sealing device includes: a rotating part rotatably connected with the casing; a sealing part connected with the rotating part and configured to stretch and retract relative to the rotating part, and in the sealed state, the sealing part extending out of the rotating part and being closely fitted with an inner wall of the window opening.

According to some embodiments of the present disclosure, a plurality of the sealing parts are provided, and connected in sequence along a length direction of the rotating part, and two adjacent sealing parts are movable relative to each other.

According to some embodiments of the present disclosure, one end of the sealing device is connected with the casing, and the other end of the sealing device is movable relative to the casing.

According to some embodiments of the present disclosure, the sealing device has a retracted state, and the sealing device includes: a first sliding rail arranged on the chassis and located in the cabinet; a first sliding member slidably fitted with the first sliding rail, in the retracted state, the first sliding member being received in the cabinet, and in the sealed state, the first sliding member sliding outwards relative to the first sliding rail and contacting with the lower end of the window sash to seal the gap between the window sash and the window opening.

According to some embodiments of the present disclosure, the first sliding rail is sleeved over the first sliding member. In the retracted state, the first sliding member is received in the first sliding rail.

According to some embodiments of the present disclosure, two first sliding rails are provided, and spaced apart from each other in a width direction of the chassis to form a wiring space of the window air conditioner.

According to some embodiments of the present disclosure, the first sliding member is a hollow part, and thermal insulation materials are filled in the first sliding member.

According to some embodiments of the present disclosure, the sealing device has a retracted state, and the sealing device includes: a telescopic member, one end of the telescopic member is telescopically connected with the casing; a sealing plate connected with the other end of the telescopic member, in the sealed state, the telescopic member being extended and the sealing plate being closely fitted with the inner wall of the window opening, and in the retracted state, the telescopic member being retracted and the sealing plate being received in the receiving groove.

According to some embodiments of the present disclosure, an adhesive layer is arranged at a side surface of the sealing plate close to the window frame, and in the sealed state, the sealing plate is hermetically fitted with the window frame through the adhesive layer.

According to some embodiments of the present disclosure, the sealing device includes: a fixing member connected with the casing; a second sliding member slidably fitted with the fixing member, the second sliding member having a first position and a second position, in the first position, the second sliding member overlapping the fixing member, in the second position, the second sliding member sliding and extending out of the fixing member and contacting with the window opening, and the fixing member and the second sliding member contacting with the window sash to seal the gap between the window sash and the window opening.

According to some embodiments of the present disclosure, the window air conditioner further includes a positioning member. The fixing member is provided with a plurality of first positioning holes spaced apart from one another, the second sliding member is provided with a plurality of second positioning holes right opposite to the first positioning holes, and in the second position, the positioning member passes through the first positioning hole to be fitted with the second positioning hole so as to position the second sliding member.

According to some embodiments of the present disclosure, one of the fixing member and the second sliding member is provided with a positioning part, and the other one of the fixing member and the second sliding member is provided with a latching part fitted with the positioning part. The positioning part has a deformed state and a positioned state, the latching part has a plurality of latching grooves spaced apart from one another along a length direction of the latching part. In the positioned state, at least a part of the positioning part is extended into the latching groove to only restrict a degree of freedom of a movement of the second sliding member in a direction approaching the fixing member, and in the deformed state, the positioning part is separated from the latching groove.

According to some embodiments of the present disclosure, the positioning part has a first inclined surface and a second inclined surface, an included angle α between the first inclined surface and a reference plane is larger than 90 degrees, and an included angle β between the second inclined surface and the reference plane is equal to 90 degrees. Each latching groove has a third inclined surface and a fourth inclined surface, the third inclined surface is arranged parallel to the first inclined surface, and the fourth inclined surface is arranged parallel to the second inclined surface. When the second sliding member moves in a direction running away from the fixing member, the first inclined surface and the third inclined surface are slidably fitted with each other, and when the second sliding member moves in a direction approaching the fixing member, the second inclined surface abuts against the fourth inclined surface to restrict a movement of the second sliding member, and the reference plane is a horizontal plane parallel to an extension direction of the latching part.

According to some embodiments of the present disclosure, one of the fixing member and the second sliding member is provided with an assembling groove, the positioning part is arranged in the assembling groove, and the positioning part is an elastic member.

According to some embodiments of the present disclosure, the fixing member is sleeved over the second sliding member, and in the first position, the second sliding member is received in the fixing member.

According to some embodiments of the present disclosure, at least one of the fixing member and the second sliding member is provided with a thermal insulation layer.

According to some embodiments of the present disclosure, one of the fixing member and the second sliding member is provided with a second sliding rail, and the other one of the fixing member and the second sliding member is provided with a sliding groove slidably fitted with the second sliding rail.

According to some embodiments of the present disclosure, an outer surface of the sealing device is provided with a flexible first sealing member, and a part of a bottom wall of the window sash abuts against the first sealing member.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
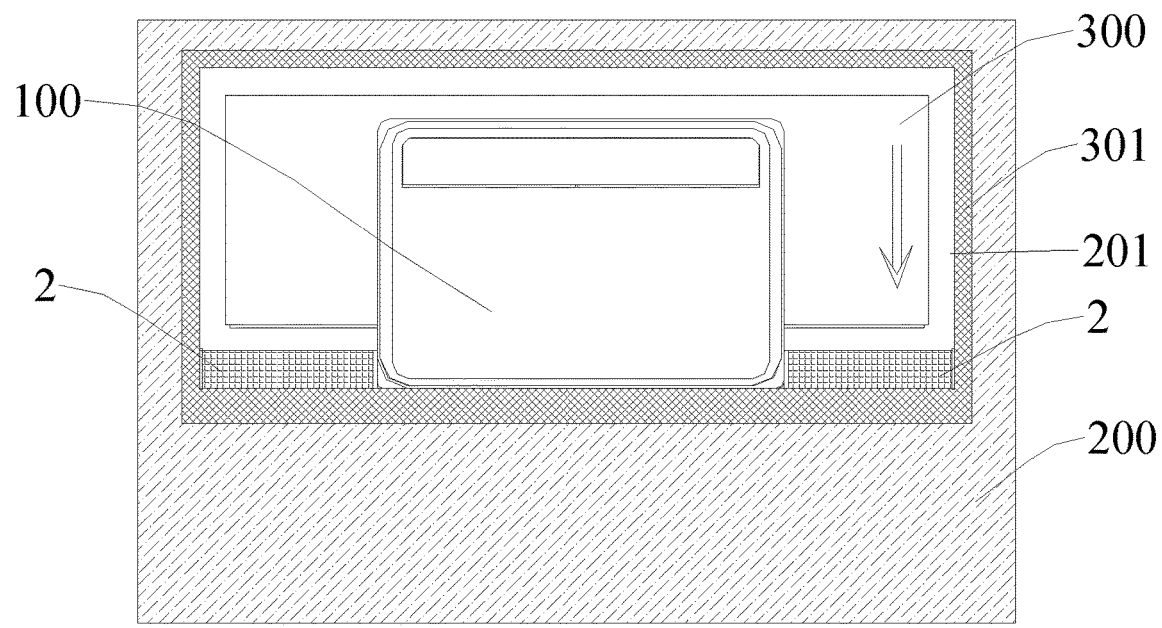
FIG. 1 is a schematic view illustrating a fit structure of a window air conditioner and a wall according to embodiments of the present disclosure.

REFERENCE NUMERALS window air conditioner 100,
 casing 1, indoor heat exchanger 41, indoor fan 42, outdoor heat exchanger 43, compressor 44,
 cabinet 11, receiving groove 111, rotating shaft 112, assembling slot 113,
 chassis 12, recessed part 121, accommodating groove 122,
 sealing device 2,
 connecting end 21, hook 211, assembling opening 212,
 sealing end 22,
 rotating part 23,
 sealing part 24, adhesive layer 241,
 wall 200, window opening 201,
 window sash 300, window frame 301,
 first sliding rail 25, first sliding member 26, telescopic member 27, sealing plate 28, wiring space 123,
 fixing member 10,
 first positioning hole 110, positioning part 120, connecting arm 1210, assembling protrusion 1220, first inclined surface 1220*a*, second inclined surface 1220*b*, assembling groove 130, second sliding rail 140,
 second sliding member 20,
 second positioning hole 210, latching part 220, latching groove 2210, third inclined surface 2210*a*, fourth inclined surface 2210*b*, sliding groove 230,
 positioning member 30.

DETAILED DESCRIPTION

Embodiments of the present disclosure are further described with reference to the accompanying drawings. Same or similar reference signs represent the same or similar components or components that have the same or similar functions from beginning to end. The embodiments described below with reference to the accompanying drawings are exemplary, are merely configured to explain the present disclosure, and cannot be construed as a limitation to the present disclosure.

A window air conditioner 100 according to embodiments of the present disclosure will be described below with reference to FIGS. 1-32.

According to embodiments of the present disclosure, a window frame 301 is embedded in a wall 200 and a window opening 201 is formed on an inner side of the window frame 301. The window air conditioner 100 may be mounted in the window opening 201 and a movable window sash 300 is provided in the window opening 201. The window air conditioner 100 includes: a casing 1, an indoor heat exchanger 41, an indoor fan 42, an outdoor heat exchanger 43 and a compressor 44. The window air conditioner 100 may further include an outdoor fan. The casing 1 may include a cabinet 11 and a chassis 12. An outer peripheral wall of the cabinet 11 is provided with a receiving groove 111 recessed downwards so as to separate the cabinet 11 into an indoor part and an outdoor part. At least a part of the window sash 300 may extend into the receiving groove 111. The chassis 12 may be arranged at a bottom of the cabinet 11 and arranged on the window frame 301. The cabinet 11 may be an integral cabinet, or may include a front cabinet and a rear cabinet arranged on both sides of the receiving groove 111. The indoor heat exchanger 41 and the indoor fan 42 are arranged in the indoor part, while the outdoor fan, the outdoor heat exchanger 43 and the compressor 44 are respectively arranged in the outdoor part. It should be noted that, in some embodiments, the window frame 301 may not be embedded in the wall 200, and the window opening 201 may be opened directly in the wall 200.

Specifically, when the window air conditioner 100 is mounted, the window air conditioner 100 may be arranged in the window opening 201, and the window sash 300 may move up and down relative to the wall 200. The window sash 300 may be extended into the receiving groove 111 of the cabinet 11, when the window sash 300 moves downward. Thus, the indoor part and the outdoor part of the window air conditioner 100 can be separated from each other.

In the window air conditioner 100 according to embodiments of the present disclosure, with the receiving groove 111 in casing 11, the window sash 300 may extend into the receiving groove 111 of the cabinet 11 when moving downwards, such that the window sash 300 may have a fixing effect to the mounting of the window air conditioner 100 to a certain degree, and also provide a certain sound insulation effect to reduce noises transmitted from the outdoor part to the indoor part.

In some embodiments of the present disclosure, the window air conditioner also includes a sealing device 2. A connecting end 21 of the sealing device 2 may be connected to the casing 1. The sealing device 2 has a sealed state. In the sealed state, at least a part of the sealing device 2 is arranged outside the casing 1 and contacts with a lower end of the window sash to seal a gap between the window sash 300 and the window opening 201.

It may be understood that, due to a height difference between a bottom wall of the receiving groove 111 and a bottom wall of the window opening 201, after the window sash 300 is fitted with the window air conditioner 100, there is an assembling gap between a bottom wall of the window sash 300 and the bottom wall of the window opening 201, such that the window air conditioner 100 has a cold air leakage, thus affecting cooling and heating efficiencies of the window air conditioner 100. The sealing device 2 may be fitted with the window opening 201 to seal the assembling gap between the window sash 300 and the window opening 201, thereby improving the cooling efficiency of the window air conditioner 100.

Further, the sealing device 2 further has a retracted state, and in the retracted state, the sealing device 2 is received in the casing 1. Specifically, when the window air conditioner 100 is in transit, the sealing device 2 may be in the retracted state, and the sealing device 2 may be received in the casing 1, thereby reducing the occupied volume of the sealing device 2. When the window air conditioner 100 is assembled in the window opening 201, the sealing device 2 may be adjusted to the sealed state.

Furthermore, in some embodiments, the connecting end of the sealing device 2 is rotatably connected with the casing 1, thereby facilitating the adjustment of the sealing device 2 to the sealed state.

The window air conditioner 100 according to some embodiments of the present disclosure will be described below with reference to FIGS. 1-11.

As illustrated in FIG. 1, a window frame 301 is embedded in a wall 200, and a window opening 201 is formed on inner side of the window frame 301. The window air conditioner 100 may be mounted in the window opening 201. The window air conditioner 100 may have an indoor part and an outdoor part, and a window sash 300 may be provided in the window opening 201 and configured to move up and down. The window sash 300 may be hermetically fitted with walls of the window opening 201 and the window air conditioner 100 to separate the indoor part from the outdoor part, thereby ensuring a normal operation of the window air conditioner 100.

Figure 9:
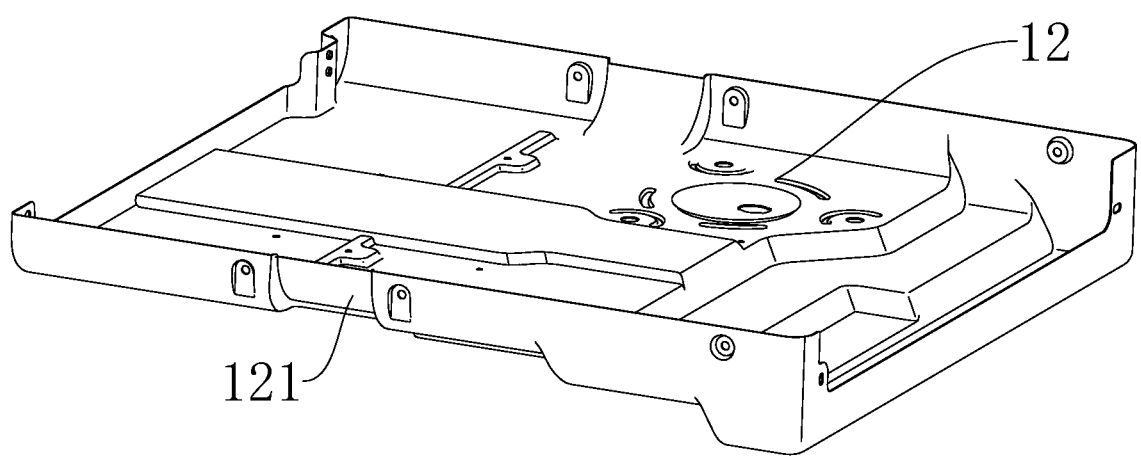
FIG. 9 is a schematic view of a chassis according to a first embodiment of the present disclosure.
Figure 10:
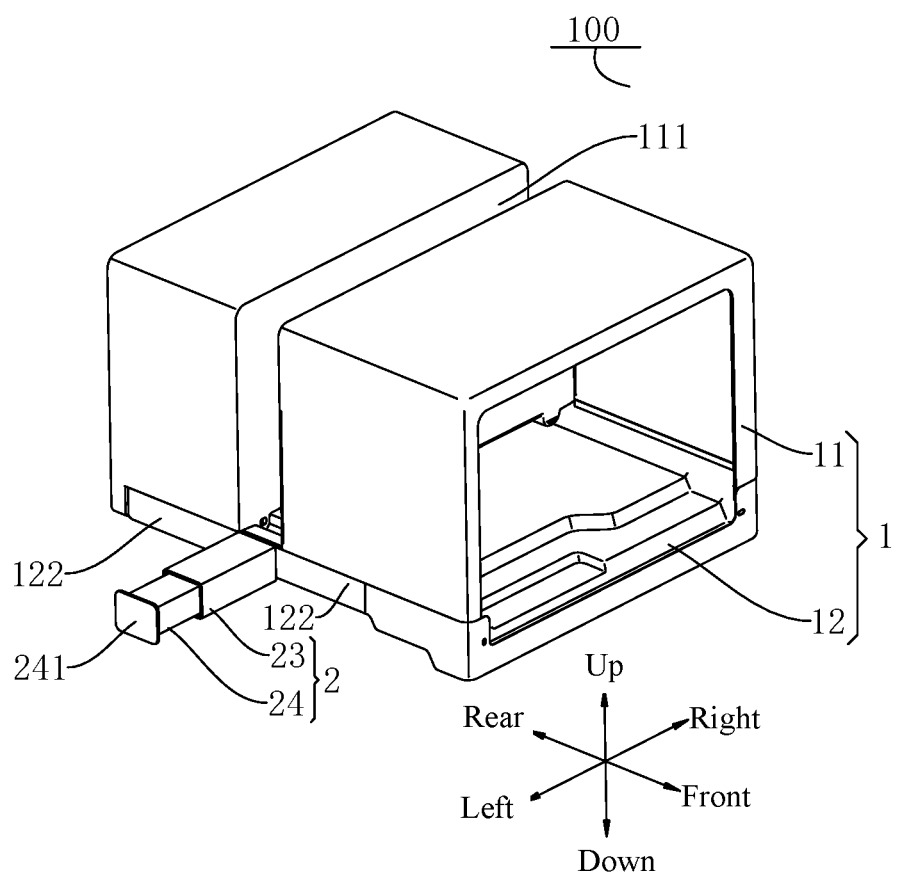
FIG. 10 is a schematic view illustrating an assembled structure of a sealing device and a casing according to a second embodiment of the present disclosure.
Figure 11:
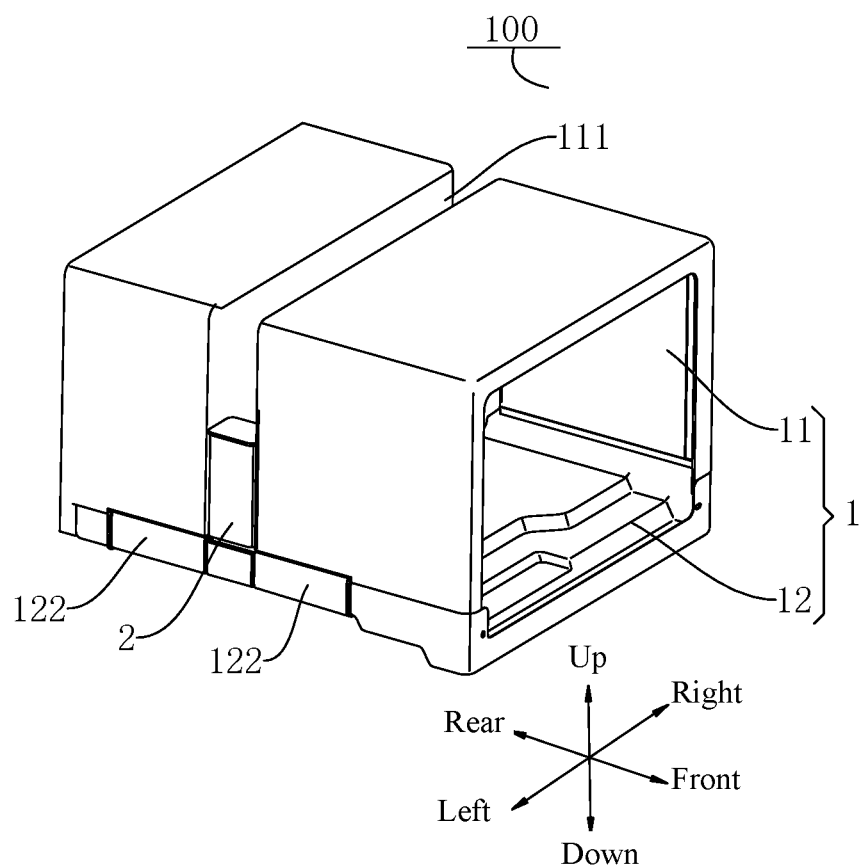
FIG. 11 is a schematic view illustrating a sealing device in a retracted state according to a second embodiment of the present disclosure.

As illustrated in FIGS. 10-11, the window air conditioner 100 according to embodiments of the present disclosure includes a casing 1 and a sealing device 2. As illustrated in FIG. 9 and FIG. 10, the casing 1 includes a cabinet 11 and a chassis 12, and an outer peripheral wall of the cabinet 11 is provided with a receiving groove 111 recessed downwards. The cabinet 11 may be an integral cabinet, or include a front cabinet and a rear cabinet arranged on both sides of the receiving groove 111. At least a part of the window sash 300 may be extended into the receiving groove 111. The chassis 12 may be arranged at a bottom of the cabinet 11 and arranged on the window frame 301. Specifically, when the window air conditioner 100 is mounted, the window air conditioner 100 may be arranged in the window opening 201, and the window sash 300 may move up and down relative to the wall 200. When moving downwards, the window sash 300 may extend into the receiving groove 111 of the cabinet 11. Thus, the indoor part and the outdoor part of the window air conditioner 100 may be separated from each other.

When the window air conditioner 100 is mounted, the window sash 300 may move downwards relative to the wall 200 and extend into the receiving groove 111. The left side wall and the right side wall of the window sash 300 may be closely fitted with an inner peripheral wall of the window frame 301, and a part of a lower end of the window sash 300 may be closely fitted with a bottom of the receiving groove 111. The rest of the lower end of the window sash 300 may be closely fitted with a bottom of the window frame through the sealing device 2, so as to improve a sealing effect between the window sash 300 and the window opening 201, thus further improving the cooling and heating efficiencies of the window air conditioner 100.

As illustrated in FIGS. 2-3 and FIGS. 10-11, the connecting end 21 of the sealing device 2 may be rotatably connected with the casing 1, such that the sealing device 2 may have a retracted state and a sealed state, and the sealing device 2 may rotate and switch between the retracted state and the sealed state. In the retracted state, the sealing device 2 may be received in the casing 1. In the sealed state, the sealing device 2 may extend out of the casing 1 and contact with the lower end of the window sash 300 to seal the gap between the window sash 300 and the window opening 201.

It may be understood that, due to a height difference between the bottom wall of the receiving groove 111 and the bottom wall of the window opening 201, there is an assembling gap between the bottom wall of the window sash 300 and the bottom wall of the window opening 201, when the window sash 300 is fitted with the window air conditioner 100. Thus, the window air conditioner 100 will have a cold air leakage, thereby affecting the cooling and heating efficiencies of the window air conditioner 100. The sealing device 2 may be fitted with the window opening 201 to seal the assembling gap between the window sash 300 and the window opening 201, thereby improving the cooling efficiency of the window air conditioner 100.

Specifically, when the window air conditioner 100 is in transit, the sealing device 2 may be in the retracted state, and the sealing device 2 may be received in the casing 1, thereby reducing the occupied volume of the sealing device 2. When the window air conditioner 100 is assembled in the window opening 201, the sealing device 2 may be adjusted to the sealed state. The sealing device 2 may have a connecting end 21 and a sealing end 22, and the connecting end 21 of the sealing device 2 may rotate relative to the casing 1. Thus, the sealing device 2 may switch between the sealed state and the retracted state. When the sealing device 2 is in the sealed state, the bottom wall of the sealing device 2 may be fitted with the bottom wall of the window opening 201, and the sealing end 22 of the sealing device 2 may be closely fitted with an inner side wall of the window opening 201, thereby sealing the assembling gap between the window sash 300 and the window opening 201, and preventing the window air conditioner 100 from having the cold air leakage.

Optionally, the sealing device 2 may be a non-metallic part, which has advantages of a light weight as well as convenient mounting and dismounting. For example, the sealing device 2 may be made of non-metallic materials such as plastics, rubber and silica gel. Of course, the sealing device 2 may also be a metal part, which has advantages of a firm structure and a long service life. For example, the sealing device 2 may be a sheet metal part.

Optionally, the sealing device 2 may have a detachable connection with the casing 1, and the sealing device 2 may be configured to have different models. The sealing devices 2 of different models may have different lengths and heights. An appropriate sealing device 2 may be selected according to a distance between the casing 1 and the window opening 201 and a height difference between the bottom wall of the receiving groove 111 and the inner wall of the window opening 201, thereby improving the applicability of the sealing device 2. Thus, the fit structure between the sealing device 2 and the window opening 201 is close, thereby providing a good sealing effect.

First, with reference to FIGS. 1-9, a window air conditioner 100 according to a first embodiment of the present disclosure will be described as follows.

As illustrated in FIG. 1, a window frame 301 is embedded in a wall 200, an inner side of the window frame 301 is provided with a window opening 201, and a window sash 300 is arranged in the window opening 201 and configured to move up and down relative to the window opening 201.

As illustrated in FIGS. 2-5, the window air conditioner 100 includes a casing 1 and a sealing device 2. The casing 1 includes a cabinet 11 and a chassis 12. The cabinet 11 is provided with a receiving groove 111 recessed downwards, and the chassis 12 is arranged at a bottom of the cabinet 11. The chassis 12 is arranged on the window frame 301. The cabinet 11 may be an integral cabinet, or may include a front cabinet and a rear cabinet arranged on both sides of the receiving groove 111. The sealing device 2 is provided on each of left and right sides of the cabinet 11, and each sealing device 2 has a connecting end 21 and a sealing end 22. The connecting end 21 of the sealing device 2 is rotatably connected with the cabinet 11, and the sealing end 22 of the sealing device 2 may be fitted with an inner wall of the window frame 301. The sealing device 2 has a retracted state and a sealed state. When the window air conditioner 100 is in transit, the sealing device 2 may be in the retracted state. The sealing device 2 may be received in the casing 1, thereby reducing the occupied volume of the sealing device 2. When the window air conditioner 100 is assembled in the window opening 201, first, the window sash 300 moves downwards and extends into the receiving groove 111 of the cabinet 11. Then, the sealing device 2 is adjusted from the retracted state to the sealed state. The connecting end 21 of the sealing device 2 rotates relative to the casing 1 such that a bottom wall and a side wall of the sealing device 2 are closely fitted with an inner peripheral wall of the window frame 301, respectively. Thus, a sealed fit between the window air conditioner 100 and the window opening 201 can be realized, and a cold air leakage of the window air conditioner 100 can be prevented, thereby improving the cooling and heating efficiencies of the window air conditioner 100.

It should be noted that an arrangement manner of the sealing device 2 is not limited to this, but may be selected and set according to the actual mounting situation. For example, the sealing device 2 may be provided only on one side of the casing 1 along a width direction (i.e. a left and right direction as illustrated in FIG. 10), and the other side of the casing 1 along the width direction may be closely fitted with the inner wall of the window opening 201. Thus, the sealed fit between the window air conditioner 100 and the window opening 201 can also be realized.

In the window air conditioner 100 according to embodiments of the present disclosure, with the sealing device 2 rotatable with respect to the casing 1, the sealing device 2 may be fitted with the window opening 201 to seal the assembling gap between the window sash 300 and the window opening 201, so as to improve the sealing effect of the window air conditioner 100 and enhance the cooling and heating efficiency of the window air conditioner 100. The window air conditioner 100 has a convenient operation and a good sealing performance, and also is suitable for different types of window openings 201, thus providing a strong practicability.

Figure 2:
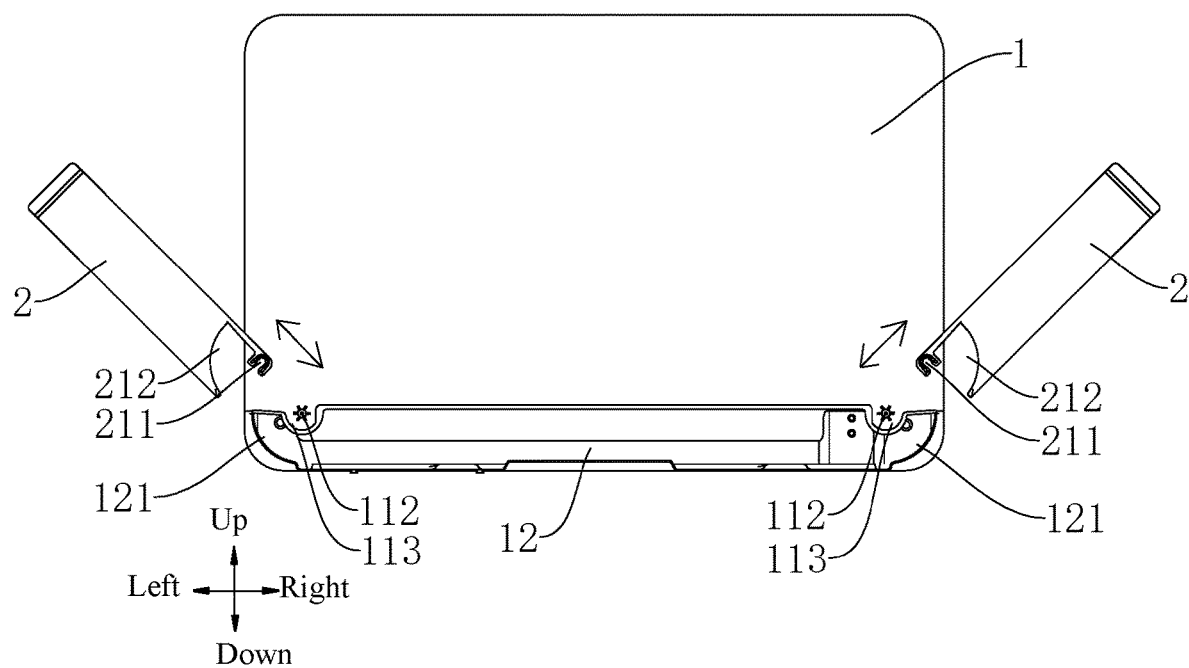
FIG. 2 is a schematic view illustrating an assembled state of a sealing device and a casing according to a first embodiment of the present disclosure.
Figure 3:
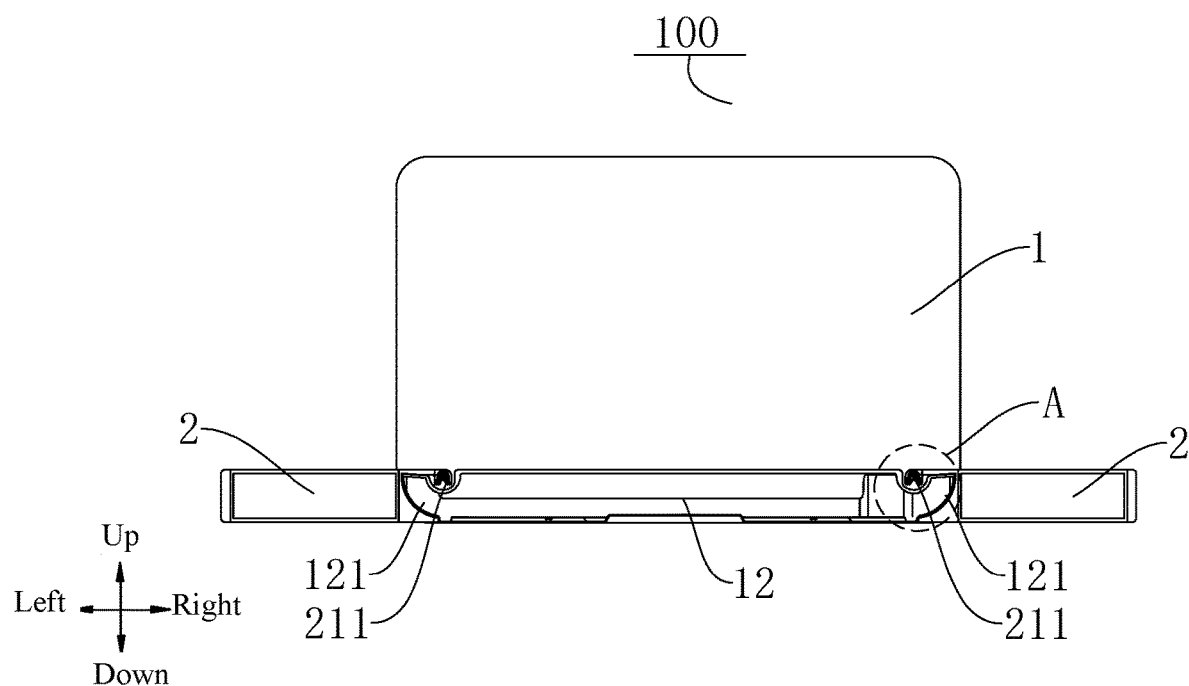
FIG. 3 is a schematic view of a sealing device in a sealed state according to a first embodiment of the present disclosure.
Figure 4:
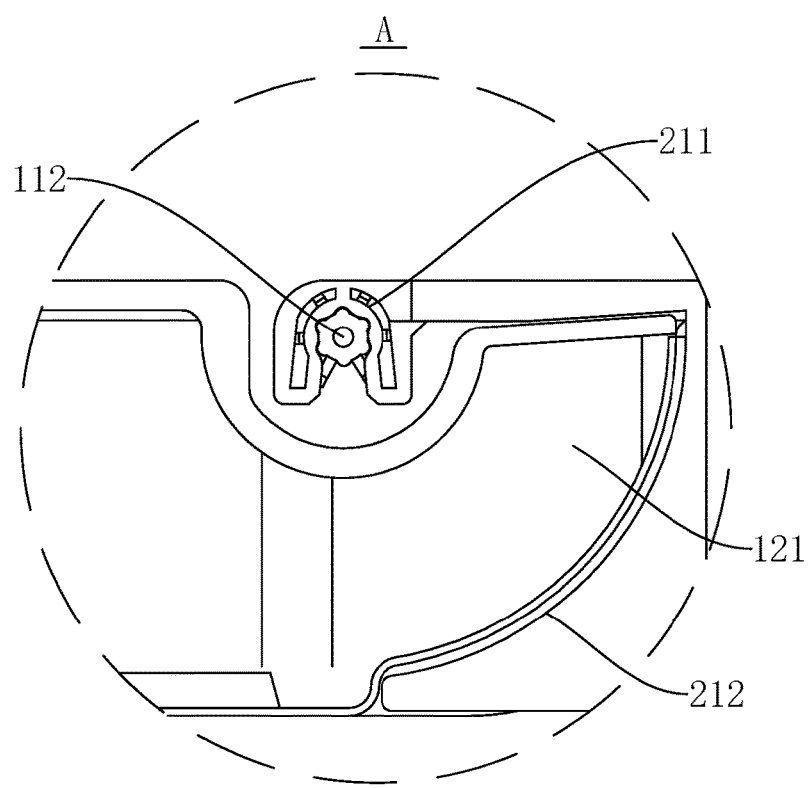
FIG. 4 is a partially enlarged view of a circled portion A in FIG. 3.
Figure 5:
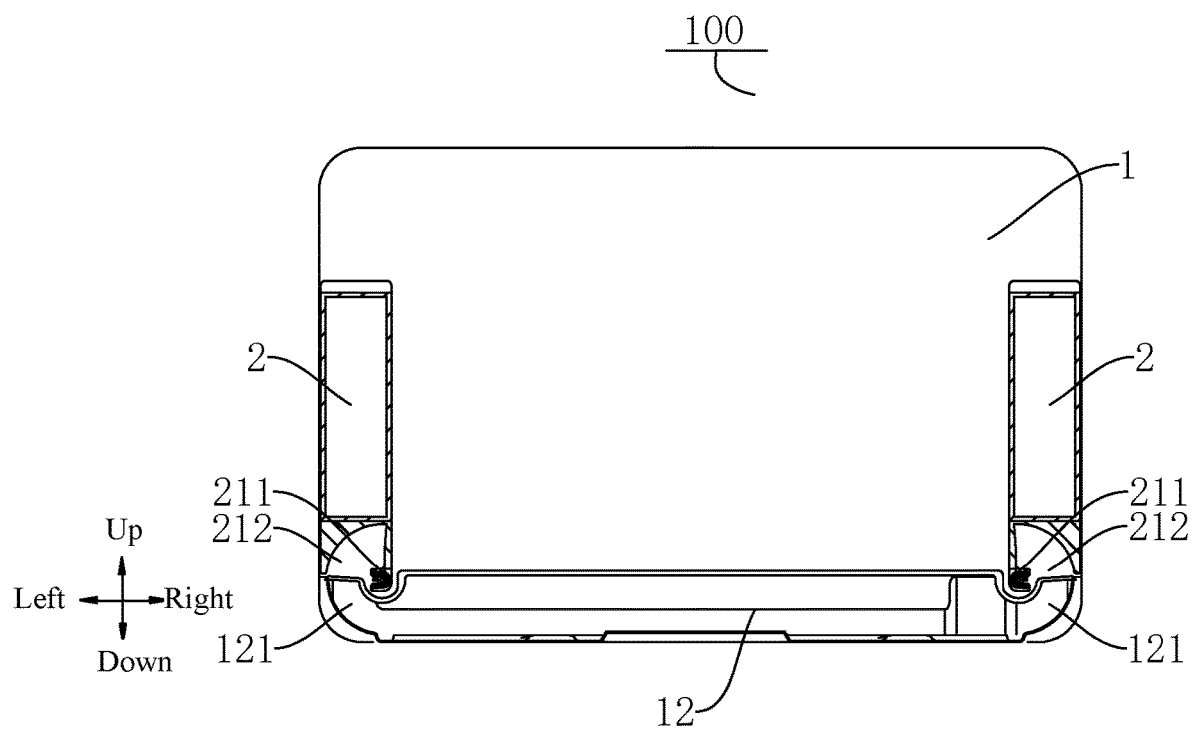
FIG. 5 is a schematic view of a sealing device in a retracted state according to a first embodiment of the present disclosure.

As illustrated in FIGS. 1-5, according to some embodiments of the present disclosure, the casing 1 may be provided with a rotating shaft 112, and the connecting end 21 of the sealing device 2 may be provided with a hook 211. The hook 211 may be hooked on the rotating shaft 112, and the sealing device 2 may rotate relative to the rotating shaft 112, thus making the fit structure of the sealing device 2 and the casing 1 simple and convenient to operate. For example, as illustrated in FIGS. 2 and 5, an end of the rotating shaft 112 is rotatably connected to the casing 1, and the hook 211 is hooked on the rotating shaft 112. When the sealing device 2 rotates to a position where the sealing device 2 is perpendicular to a horizontal plane, the sealing device 2 is in the retracted state. In this case, an outer side wall of the sealing device 2 is flush with the outer side wall of the cabinet 11, and the sealing device 2 is received in the receiving groove 111, such that the fit structure of the sealing device 2 and the cabinet 11 is compact. When the sealing device 2 rotates to a position where the sealing device 2 is parallel to the horizontal plane, the sealing device 2 is in the sealed state. The bottom wall and the end of the sealing device 2 are both closely fitted with the inner wall of the window opening 201, that is, they are in contact with the window frame 301.

Optionally, the hook 211 may have a detachable connection structure with the rotating shaft 112, thereby facilitating the maintenance and replacement of the sealing device 2, so as to improve the usage flexibility for a user.

Figure 7:
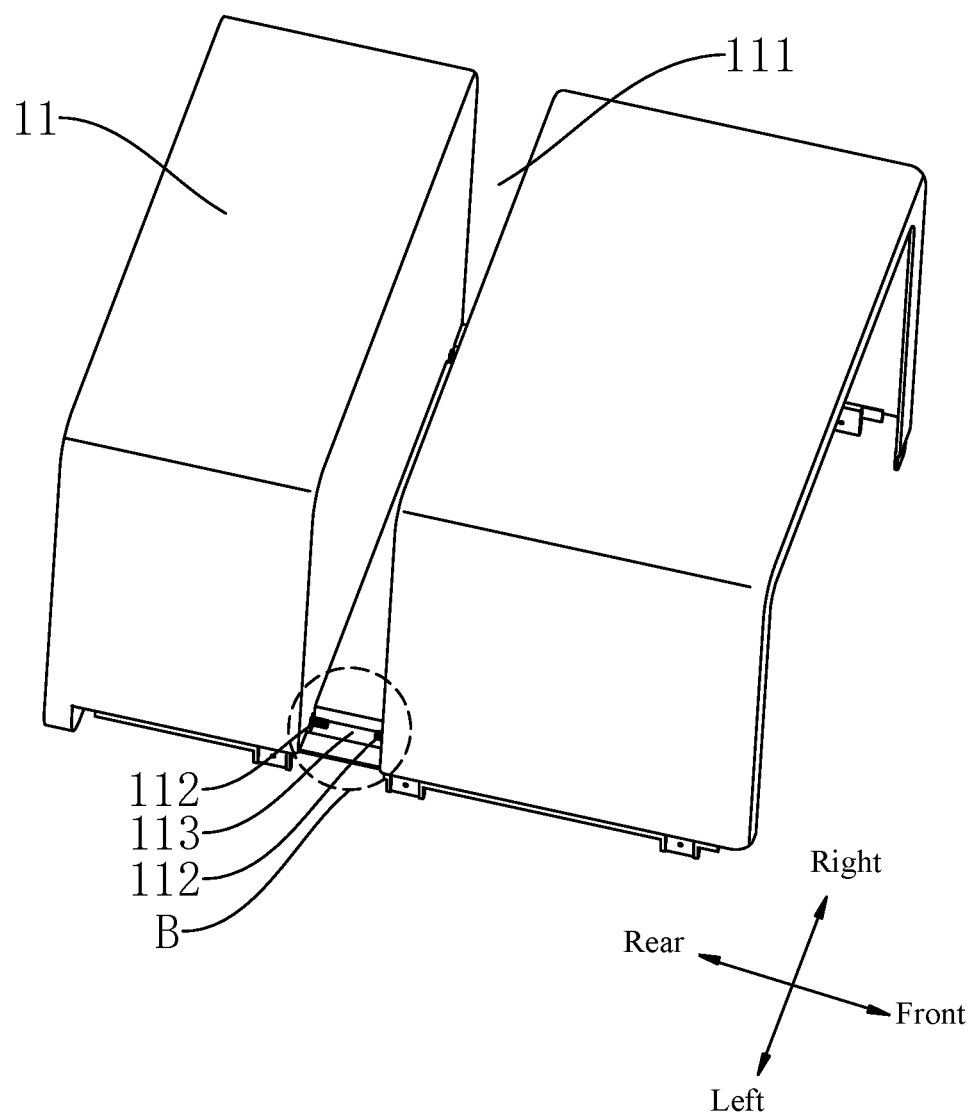
FIG. 7 is a schematic view of a cabinet according to a first embodiment of the present disclosure.
Figure 8:
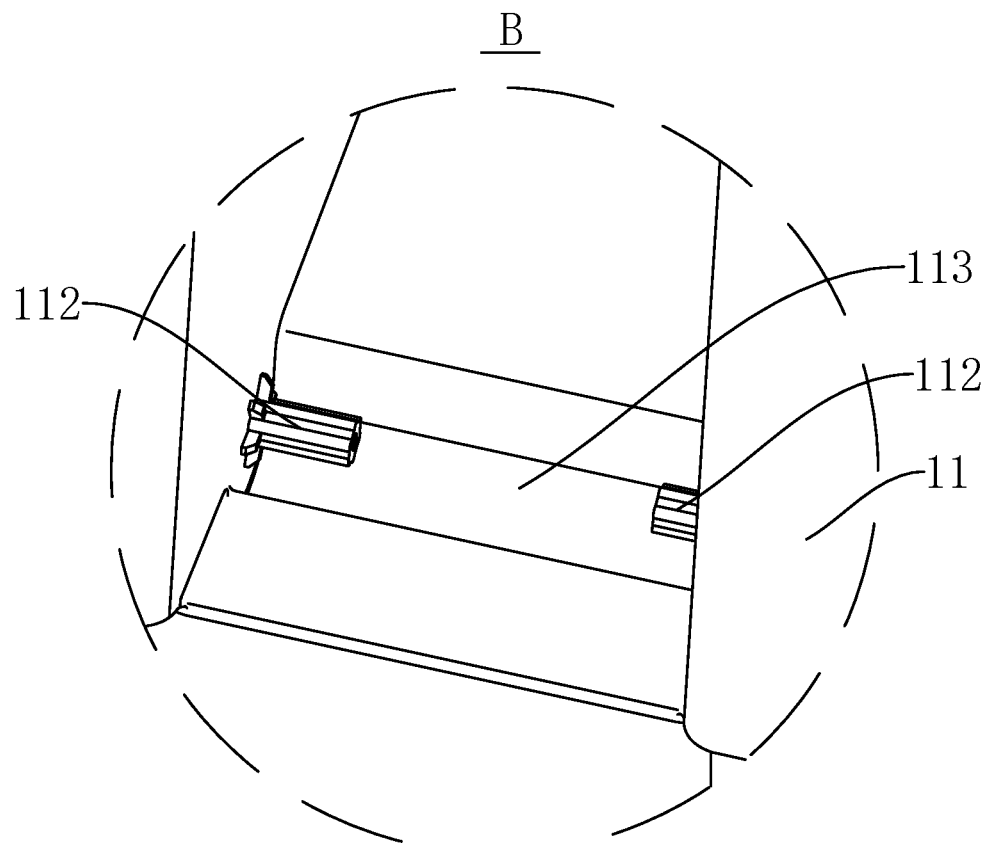
FIG. 8 is an enlarged view of a circled portion B in FIG. 7.

As illustrated in FIGS. 7-8, in some embodiments of the present disclosure, a bottom wall of the receiving groove 111 may be provided with an assembling slot 113 recessed downwards, and the rotating shaft 112 may be arranged in the assembling slot 113, such that the fit structure of the sealing device 2 and the receiving groove 111 is compact. Specifically, the assembling slot 113 may include an accommodating space and a rotating space for the hook 211. When the sealing device 2 is fitted with the casing 1, the hook 211 may be hooked on the rotating shaft 112, and the hook 211 may rotate in the assembling slot 113, thus ensuring the smooth rotation of the hook 211.

Optionally, the sealing device 2 may be provided with two hooks 211, and the two hooks 211 may be spaced apart from each other in a width direction of the sealing device 2. Two rotating shafts 112 may be provided in the assembling slot 113, and the two hooks 211 may be hooked on the corresponding rotating shafts 112, respectively, thus making the connection structure between the sealing device 2 and the casing 1 firm.

As illustrated in FIGS. 4 and 9, in some embodiments of the present disclosure, an outer peripheral wall of the chassis 12 may be provided with a recessed part 121, and the connecting end 21 of the sealing device 2 may be provided with an assembling opening 212. In the sealed state, a part of the chassis 12 may be extended into the assembling opening 212 such that an outer peripheral wall of the recessed part 121 is fitted with an inner peripheral wall of the assembling opening 212. Thus, the fit structure between the sealing device 2 and the casing 1 is ingenious, and the normal rotation of the sealing device 2 with respect to the casing 1 is ensured.

For example, as illustrated in FIG. 9, the recessed part 121 is arranged at the bottom of the chassis 12, and the outer peripheral wall of the recessed part 121 has a circular arc shape. The connecting end 21 of the sealing device 2 is provided with the assembling opening 212, and the inner wall of the assembling opening 212 also has a circular arc shape. The assembling opening 212 and the recessed part 121 form an arc-surface fit. When the sealing device 2 rotates relative to the chassis 12, the assembling opening 212 may slide relative to the recessed part 121. As illustrated in FIG. 5, when the sealing device 2 is in the retracted state, the recessed part 121 is separated from the assembling opening 212. As illustrated in FIG. 2, when the sealing device 2 is in the sealed state, the recessed part 121 is fully received in the assembling opening 212.

Figure 6:
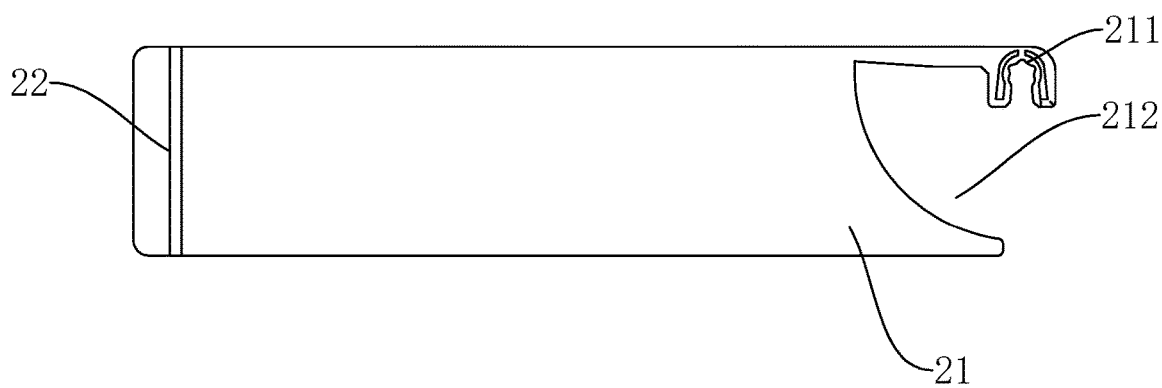
FIG. 6 is a schematic view illustrating an overall structure of a sealing device according to a first embodiment of the present disclosure.

As illustrated in FIG. 6, in a specific example of the present disclosure, the sealing device 2 includes the connecting end 21 and the sealing end 22. The connecting end 21 is provided with the assembling opening 212, and the inner peripheral wall of the assembling opening 212 has a circular arc shape. An end of the sealing device 2 close to the assembling opening 212 is provided with the hook 211. The sealing end 22 faces away from the connecting end 21, and the sealing end 22 is stretchable and retractable relative to the connecting end 21. As illustrated in FIG. 9, the bottom wall of the chassis 12 is provided with the recessed part 121, and the outer peripheral wall of the recessed part 121 has a circular arc shape.

When the sealing device 2 and the casing 1 are assembled, the hook 211 may be hooked on the rotating shaft 112. When the sealing device 2 rotates relative to the chassis 12, the assembling opening 212 may slide relative to the recessed part 121. When the sealing device 2 is adjusted from the sealed state to the retracted state, first, the sealing end 22 is retracted relative to the connecting end 21. Then, the sealing device 2 rotates to the position where the sealing device 2 is perpendicular to the horizontal plane, and is received in the receiving groove 111, and the recessed part 121 is separated from the assembling opening 212. When the sealing device 2 needs to be adjusted from the retracted state to the sealed state, first, the sealing device 2 rotates to the position where the sealing device 2 is parallel to the horizontal plane, and the recessed part 121 is fully received in the assembling opening 212. Then, the sealing end 22 extends outwards relative to the connecting end 21, and the bottom wall and the left side wall of the sealing device 2 are closely fitted with the inner wall of the window opening 201. Thus, a stretched length of the sealing end 22 may be adjusted according to the actual sizes of the window opening 201 and the window air conditioner 100, which is convenient to operate, and also improves the sealing effect of the sealing device 2.

In some specific embodiments of the present disclosure, as illustrated in FIGS. 2-3, 7 and 9, the window air conditioner 100 includes the casing 1 and the sealing device 2. The casing 1 includes the cabinet 11 and the chassis 12. The cabinet 11 is provided with the receiving groove 111 recessed downwards, and a second sealing member made of silica gel materials is arranged on the bottom wall of the receiving groove 111. As illustrated in FIGS. 7-8, the bottom wall of the receiving groove 111 is provided with the assembling slot 113 recessed downwards, and two rotating shafts 112 are provided in the assembling slot 113 and arranged opposite to each other in a front and rear direction. As illustrated in FIG. 9, the chassis 12 is arranged at the bottom of the casing 1, and a part of the bottom wall of the chassis 12 opposite to the assembling slot 113 is provided with the recessed part 121. The outer peripheral wall of the recessed part 121 has a circular arc shape.

As illustrated in FIG. 1 and FIG. 6, the sealing device 2 is made of rubber materials. The sealing device 2 includes the connecting end 21 and the sealing end 22. The connecting end 21 is provided with the assembling opening 212, and the inner peripheral wall of the assembling opening 212 has a circular arc shape. The end of the sealing device 2 close to the assembling opening 212 is provided with two hooks 211 spaced apart from each other. The sealing end 22 faces away from the connecting end 21, and the sealing end 22 is stretchable and retractable relative to the connecting end 21.

When the sealing device 2 and the casing 1 are assembled, the two hooks 211 may be hooked on the corresponding rotating shafts 112, respectively, and a part of the recessed part 121 may be extended into the assembling opening 212. The sealing device 2 has the retracted state and the sealed state. When the sealing device 2 is adjusted from the sealed state to the retracted state, first, the sealing end 22 is retracted relative to the connecting end 21. Then, the sealing device 2 rotates to a position where the sealing device 2 is perpendicular to the horizontal plane of the window frame 301, and the sealing device 2 is received in the receiving groove 111. When the sealing device 2 is adjusted from the retracted state to the sealed state, first, the sealing device 2 rotates to a position where the sealing device 2 is parallel to the horizontal plane of the window frame 301, and the recessed part 121 is fully received in the assembling opening 212. Then, the sealing end 22 extends outwards relative to the connecting end 21 and abuts against the inner wall of the window frame 301, and the bottom wall and the left side wall of the sealing device 2 are closely fitted with the inner peripheral wall of the window frame 301, respectively.

The stretched length of the sealing end 22 may be adjusted according to the distance between the casing 1 and the window frame 301, such that the sealing device 2 may be suitable for different models of window openings 201 and window air conditioners 100, thereby improving the applicability of sealing device 2.

With reference to FIGS. 10, 11, 31, and 32, a window air conditioner 100 according to a second embodiment of the present disclosure will be described as follows.

Figure 31:
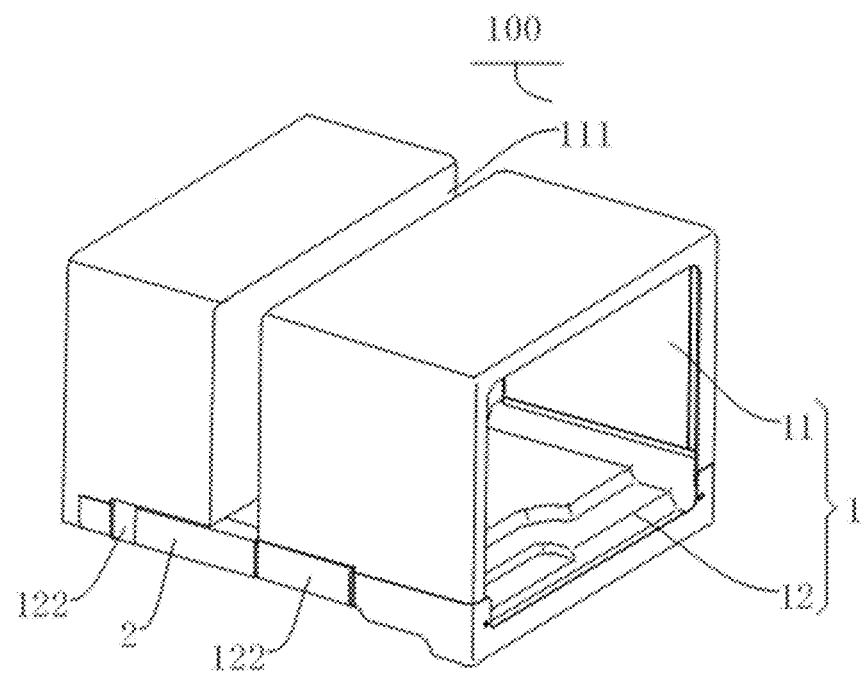
FIG. 31 is a schematic view illustrating a sealing device in a retracted state according to embodiments of the present disclosure.

As illustrated in FIG. 10, in some embodiments of the present disclosure, a plurality of accommodating grooves 122 may be formed in a side wall of the chassis 12. In the retracted state, the sealing device 2 may be received in one of the accommodating grooves 122, thereby improving the usage flexibility of the window air conditioner 100. For example, as illustrated in FIG. 11, two accommodating grooves 122 are provided in the side wall of chassis 12, and the two accommodating grooves 122 are spaced apart from each other by the receiving groove 111 of the casing 1. One of the accommodating grooves 122 is arranged in front of the receiving groove 111 and the other one of the accommodating grooves 122 is arranged in rear of the receiving groove 111. When the sealing device 2 is in the retracted state, the sealing device 2 may be received in the receiving groove 111 (e.g., as shown in FIG. 11) or in one of the accommodating grooves 122 (e.g., as shown in FIG. 31), which may be selected and set according to actual usage requirements.

As illustrated in FIG. 10, according to some embodiments of the present disclosure, the sealing device 2 may include a rotating part 23 and a sealing part 24, the rotating part 23 may be rotatably connected with the casing 1, and the sealing part 24 may be connected with the rotating part 24 and be stretchable and retractable relative to the rotating part 23. In the retracted state, at least a part of the sealing part 24 may be received in the rotating part 23, and in the sealed state, the sealing part 24 may be extended out of the rotating part 23 and close fitted with the inner wall of the window opening 201, thereby improving the applicability of the sealing device 2.

Specifically, when the sealing device 2 is adjusted from the sealed state to the retracted state, first, the sealing part 24 may be received in the rotating part 23, and then the sealing device 2 is rotated into the casing 1. When the sealing device 2 is adjusted from the retracted state to the sealed state, the sealing part 24 may be drawn out of the rotating part 23 to a corresponding length according to a width of the actual window opening 201, and the sealing device 2 is rotated to a position where the sealing device 2 is closely fitted with the inner wall of the window opening 201. Of course, the sealing device 2 may also be rotated to the position where the sealing device 2 is closely fitted with the inner wall of the window opening 201 first, and then the sealing part 24 is drawn out of the rotating part 23.

Figure 32:
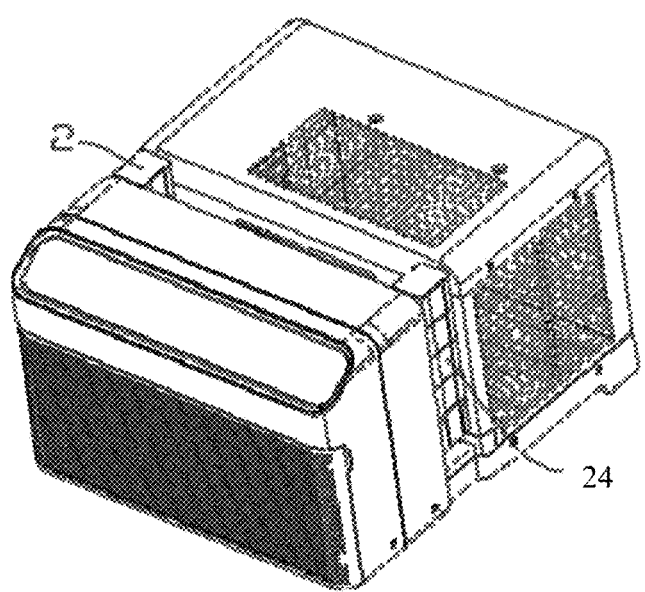
FIG. 32 is a schematic view illustrating a sealing device in a retracted state according to embodiments of the present disclosure.

Optionally, as shown in FIG. 32, a plurality of the sealing parts 24 may be provided, the plurality of the sealing parts 24 may be connected in sequence along a length direction of the rotating part 36, and adjacent two sealing parts 24 are movable with respect to each other. Thus, the applicability range of the sealing device 2 is expanded. It may be understood that, when all the plurality of the sealing parts 24 are drawn out of the rotating part 23, the sealing device 2 has a maximum length, and when all the plurality of the sealing parts 24 are received in the rotating part 23, the sealing device 2 has a minimum length. With the plurality of the sealing parts 24, a length adjustment range of the sealing device 2 can be expanded, so that the sealing device 2 may be suitable for different types of window openings 201 and window air conditioners 100.

Optionally, the sealing part 24 and the rotating part 23 both may be configured as hollow parts, and heat insulation materials may be filled in the sealing part 24 and the rotating part 23, so as to improve the insulation effect of the sealing device 2 and further improve the cooling and heating efficiency of the window air conditioner 100.

As illustrated in FIG. 10, in some embodiments of the present disclosure, an end face of the sealing part 24 close to the window opening 201 may be provided with an adhesive layer 241. In the sealed state, the sealing part 24 may be hermetically fitted with the inner wall of the window opening 201 through the adhesive layer 241, so as to make the connection structure between the sealing device 2 and the window opening 201 firm. Of course, it may be understood that a fixing manner of the sealing device 2 is not unique. For example, when the sealing device 2 is in the sealed state, the sealing device 2 may be connected with the inner wall of the window opening 201 by means of screw connection.

According to some embodiments of the present disclosure, an outer surface of the sealing device 2 may be provided with a flexible first sealing member, and a part of the bottom wall of the window sash 300 may abut against the first sealing member, so as to improve the sealing effect between the window sash 300 and the window air conditioner 100. Specifically, when the window air conditioner 100 is mounted, the window sash 300 may be moved up and down, and the part of the bottom wall of the window sash 300 may abut against a top surface of the sealing device 2. Since the first sealing member is a flexible part, the first sealing member arranged at the top surface of the sealing device 2 may be closely fitted with the bottom wall of the window sash 300, and the first sealing member arranged at a bottom surface of the sealing device 2 allows a close connection between the sealing device 2 and the inner wall of the window opening 201, so that the fit among the window sash 300, the sealing device 2 and the window opening 201 is close.

Optionally, the first sealing member may be made of soft materials such as sponge, silica gel or rubber. Optionally, the first sealing member may be arranged only to the top surface of the sealing device 2, or only to the bottom surface of the sealing device 2, or to the top surface and the bottom surface of the sealing device 2 at the same time, which may be selected and set according to the actual usage requirement, and is not limited herein.

Optionally, the first sealing member may be connected to the sealing device 2 by means of adhering and fixing through adhesives. Or, the first sealing member may also be connected with the sealing device 2 by means of a positioning-pin connection. For example, a plurality of positioning pins may be provided to a bottom of the first sealing member, and a plurality of positioning holes may be formed in the top surface of the sealing device 2. When the first sealing member is assembled with the sealing device 2, each positioning pin may be inserted into the corresponding positioning hole. Then, the first sealing member is fixed to the sealing device 2.

According to some embodiments of the present disclosure, a flexible second sealing member may be provided to an inner wall of the receiving groove 111, and a part of the bottom wall of the window sash 300 may abut against the second sealing member, so as to improve the sealing effect of the window air conditioner 100. Specifically, when the window air conditioner 100 is mounted, the window sash 300 may be moved downwards, and the part of the bottom wall of the window sash 300 may abut against the bottom wall of the receiving groove 111. Since the second sealing member may be a flexible part, the second sealing member may be hermetically fitted with the bottom wall of the window sash 300, which allows a close fit between the window sash 300 and the inner wall of the receiving groove 111.

Optionally, the second sealing member may be made of soft materials such as sponge, silica gel, or rubber. Optionally, the second sealing member may be connected with the inner wall of the receiving groove 111 by means of adhering and fixing through adhesives. Or, the second sealing member may also be connected with the inner wall of the receiving groove 111 by means of a positioning-pin connection. For example, the second sealing member may be a silicone sheet, and a layer of glue may be coated on a bottom of the second sealing member, such that the second sealing member may be connected with the inner wall of the receiving groove 111 by means of adhering and fixing.

The window air conditioner 100 according to some other embodiments of the present disclosure will be described below with reference to FIGS. 1, and 12-16. The window air conditioner 100 may be mounted in the window opening 201 of the wall 200. The window air conditioner 100 may have an indoor part and an outdoor part, and a window sash 300 may be arranged in the window opening 201 and configured to move up and down. The window sash 300 may be fitted with the window air conditioner 100 and the window opening 201 to separate the indoor part from the outdoor part, thus ensuring the normal operation of the window air conditioner 100.

As illustrated in FIGS. 12-13 and FIGS. 15-16, the window air conditioner 100 according to the embodiment of the present disclosure includes a casing 1 and a sealing device 2.

Figure 13:
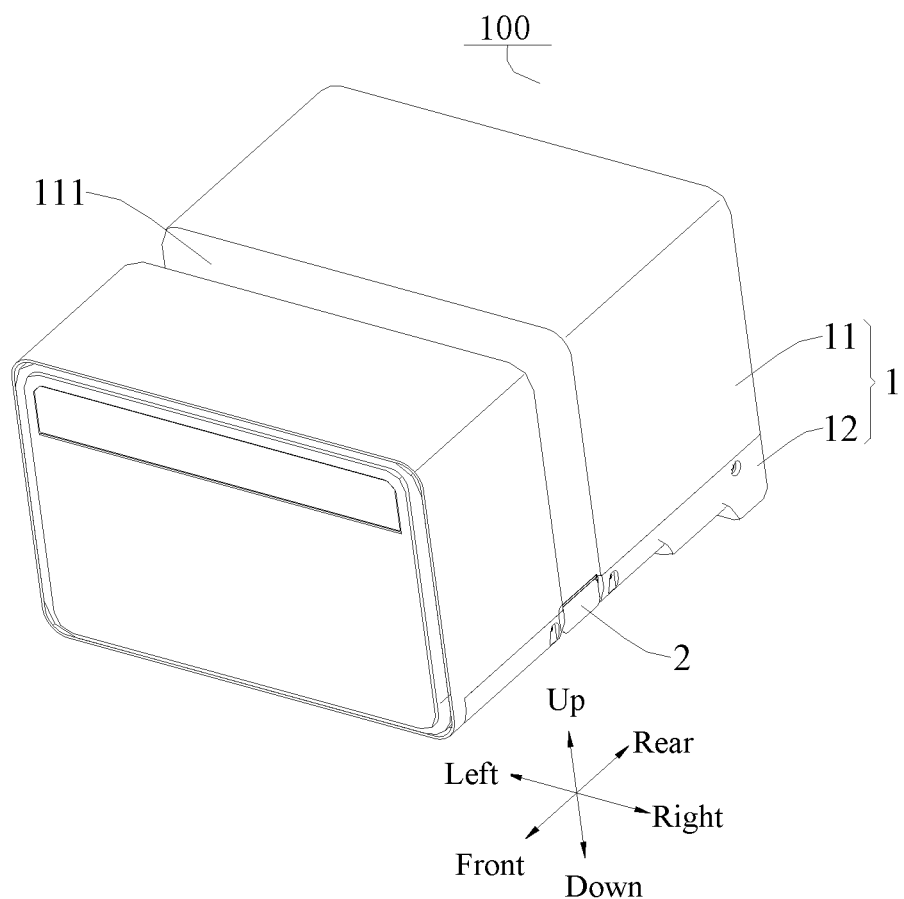
FIG. 13 is a schematic view illustrating an assembled state of a sealing device and a casing according to a third embodiment of the present disclosure, in which the sealing device is in the retracted state.

As illustrated in FIG. 13, the casing 1 may include a cabinet 11 and a chassis 12. An outer peripheral wall of the cabinet 11 may be provided with a receiving groove 111 recessed downwards, and at least a part of the window sash 300 may extend into the receiving groove 111. The chassis 12 may be disposed at a bottom of the cabinet 11 and arranged on the window frame 301 in the wall 200. Specifically, when the window air conditioner 100 is mounted, the window air conditioner 100 may be arranged in the window opening 201. The window sash 300 may move up and down relative to the wall 200. When moving downwards, the window sash 300 may extend into the receiving groove 111 of the cabinet 11. Thus, the indoor part and the outdoor part of the window air conditioner 100 may be separated from each other.

Figure 12:
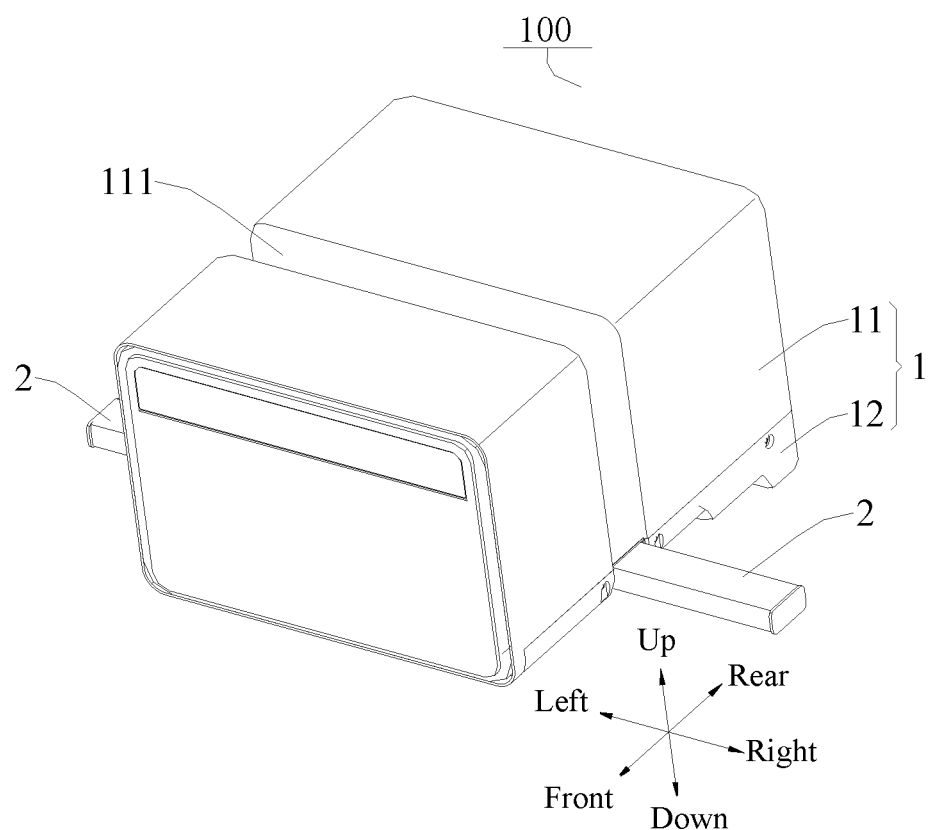
FIG. 12 is a schematic view illustrating an assembled state of a sealing device and a casing according to a third embodiment of the present disclosure, in which the sealing device is in a sealed state.
Figure 15:
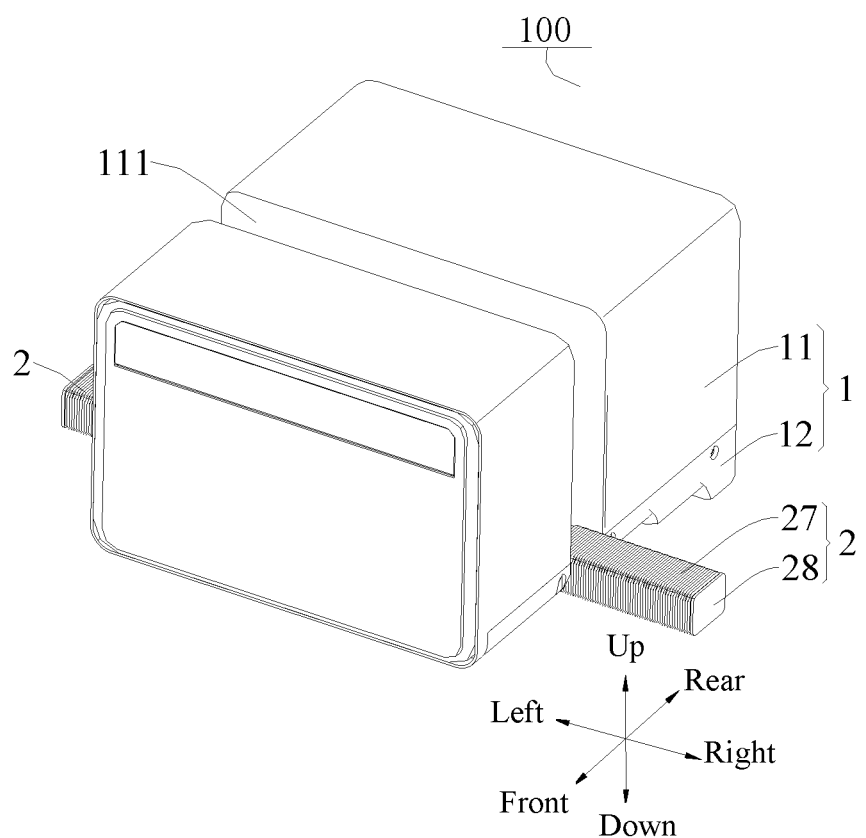
FIG. 15 is a schematic view illustrating an assembled state of a sealing device and a casing according to a fourth embodiment of the present disclosure, in which the sealing device is in a sealed state.

As illustrated in FIGS. 12 and 15, one end of the sealing device 2 may be connected with the casing 1, and the other end of the sealing device 2 may move horizontally relative to the casing 1. The sealing device 2 may have a retracted state and a sealed state. In the retracted state, the sealing device 2 may be received in the casing 1. In the sealed state, the sealing device 2 may extend outwards relative to the casing 1 and contact with a lower end of the window sash 300 to seal a gap between the window sash 300 and the window opening 201.

Specifically, when the window air conditioner 100 is in transit, the sealing device 2 may be in the retracted state, and the sealing device 2 may be received in the casing 1, thereby reducing the occupied volume of the sealing device 2. When the window air conditioner 100 is assembled in the window opening 201, the sealing device 2 may be adjusted to the sealed state. The sealing device 2 may extend outwards relative to the cabinet 11, and an outer peripheral wall of the sealing device 2 may be closely fitted with the inner peripheral wall of the window opening 201. Thus, the sealing effect between the window air conditioner 100 and the window opening 201 can be improved, and the problem of a cold air leakage in the window air conditioner 100 can be solved, thereby improving the cooling and heating efficiencies of the window air conditioner 100. When a distance between the window air conditioner 100 and the window opening 201 changes, the sealing effect of the sealing device 2 can be ensured by changing a distance that the sealing device 2 extends outwards relative to the casing 1.

With reference to FIGS. 1 and 12-14, a window air conditioner 100 according to a third embodiment of the present disclosure will be described as follows.

As illustrated in FIG. 1, a wall 200 is provided with a window frame 301, an inner side of the window frame 301 defines a window opening 201, and a window sash 300 is arranged in the window opening 201 and configured to move up and down relative to the window opening 201.

As illustrated in FIGS. 12 and 13, the window air conditioner 100 includes a casing 1 and a sealing device 2. The casing 1 includes a cabinet 11 and a chassis 12. The cabinet is provided with a receiving groove 111 recessed downwards. The chassis 12 is disposed at a bottom of the cabinet 11 and arranged on the window frame 301. Left and right ends of the cabinet 11 are provided with the sealing device 2, respectively, and the sealing device 2 may move horizontally relative to the casing 1.

The sealing device 2 has a retracted state and a sealed state. When the window air conditioner 100 is in transit, the sealing device 2 may be in the retracted state, and the sealing device 2 may be received in the casing 1, thereby reducing the occupied volume of the sealing device 2. When the window air conditioner 100 is assembled in the window opening 201, the sealing device 2 may be adjusted to the sealed state, and the sealing device 2 may extend outwards relative to the cabinet 11. The outer peripheral wall of the sealing device 2 may be closely fitted with the inner peripheral wall of the window opening 201. When the mounting position of the window air conditioner 100 changes or the size of the window opening 201 changes, the sealing effect of the sealing device 2 can be ensured by changing the distance that the sealing device 2 extends outwards relative to the casing 1. When the distance between the casing 1 and the window opening 201 increases, the sealing device 2 may be pulled outwards (in a direction running away from the casing 1). When the distance between the casing 1 and the window opening 201 decreases, the sealing device 2 may be moved inwards (in a direction approaching the casing 1). Thus, the length of the sealing device 2 is adjustable though the above arrangements, such that the sealing device 2 is suitable for different mounting occasions and the operation is relatively convenient.

It should be noted that an arrangement manner of the sealing device 2 is not limited to this, but may be selected and set according to the actual mounting situation. For example, the sealing device 2 may be provided only on one side of the casing 1 along a width direction (i.e. a left and right direction as illustrated in FIG. 12), and the other side of the casing 1 along the width direction may be closely fitted with the inner wall of the window opening 201. Thus, the sealed fit between the window air conditioner 100 and the window opening 201 can also be realized.

In the window air conditioner 100 according to the embodiment of the present disclosure, by arranging the sealing device 2 configured to move horizontally relative to the casing 1, the sealing device 2 may be fitted with the window opening 201 to seal an assembling gap between the window sash 300 and the window opening 201, thereby improving the cooling and heating efficiencies of the window air conditioner 100. The sealing device 2 is convenient to operate and the length of the sealing device 2 is adjustable, such that the sealing device 2 is suitable for different mounting occasions and has strong practicability.

Figure 14:
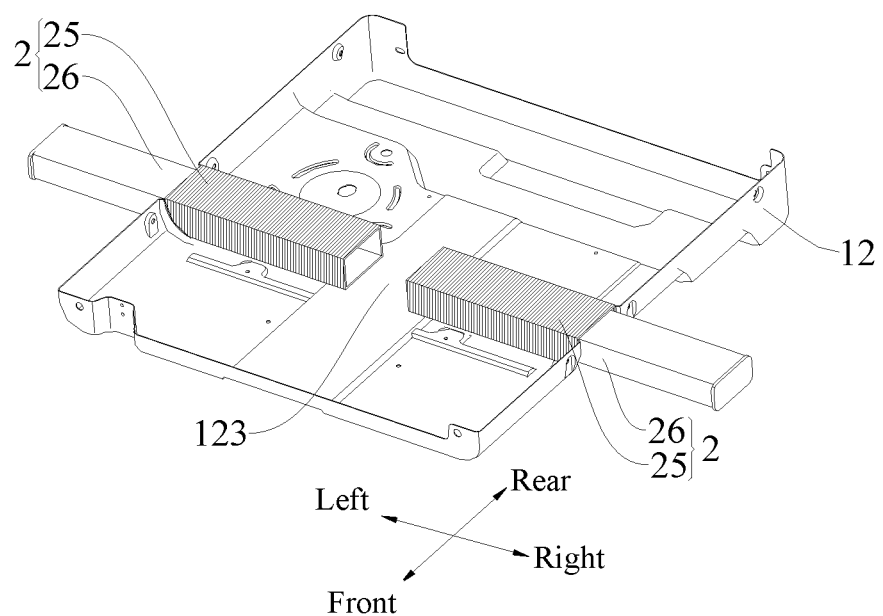
FIG. 14 is a schematic view illustrating a fit structure of a sealing device and a chassis according to a third embodiment of the present disclosure.

As illustrated in FIG. 14, according to some embodiments of the present disclosure, the sealing device 2 may include a first sliding rail 25 and a first sliding member 26. The first sliding rail 25 may be arranged on the chassis 12 and located in the cabinet 11, and the first sliding member 26 may be slidably fitted with the first sliding rail 25. In the retracted state, the first sliding member 26 may be received in the cabinet 11, and in the sealed state, the first sliding member 26 may slide outwards relative to the first sliding rail 25 (in a direction running away from the cabinet 11) and contact with a lower end of the window sash 300 to seal the gap between the window sash 300 and the window opening 201, such that the sealing device 2 has a simple design, and is easy to mount and operate.

Optionally, the first sliding rail 25 may be fixed on the chassis 12 by means of a screw connection, or the first sliding rail 25 may also be integrally molded with the chassis 12. Optionally, the first sliding rail 25 may be made of metal materials, which provides a large structural strength. Thus, the structure of the sealing device 2 is firm, so as to improve the sealing effect of the sealing device 2.

Optionally, the first sliding member 26 may be a non-metallic part, which has advantages of a light weight as well as convenient mounting and dismounting. For example, the first sliding member 26 may be made of non-metallic materials such as plastics, rubber and silica gel. Of course, the first sliding member 26 may also be a metal part, which has advantages of a firm structure and a long service life. For example, the first sliding member 26 may be a sheet metal part.

As illustrated in FIG. 14, in some embodiments of the present disclosure, the first sliding rail 25 may be sleeved over the first sliding member 26. In the retracted state, the first sliding member 26 may be received in the first sliding rail 25, thereby allowing the fit structure of the first sliding rail 25 and the first sliding member 26 to be firm. It may be understood that, since the first sliding rail 25 is sleeved over the first sliding member 26, the first sliding rail 25 may have good fixing and guiding effects, thus preventing the first sliding member 26 from having a malposition when sliding relative to the guiding rail.

Of course, it may be understood that the fit manner of the first sliding rail 25 and the first sliding member 26 is not limited to this. For example, a sliding groove may be formed in the first sliding member 26, a convex fit protrusion may be arranged on the chassis 12 to form the first sliding rail 25, and the fit protrusion may be inserted into the sliding groove so as to realize the sliding of the sealing device 2.

As illustrated in FIG. 14, in some embodiments of the present disclosure, two first sliding rails 25 may be provided, and spaced apart from each other in a width direction of the chassis 12 (for example, a left and right direction illustrated in FIG. 14) to form a wiring space 123 of the window air conditioner 100, such that an inner space configuration of the chassis 12 is reasonable and facilitates the wire routing. For example, as illustrated in FIG. 14, the two first sliding rails 25 are configured as rectangular shell structures, and the first sliding member 26 configured to slide in a left and right direction is provided in each first sliding rail 25. The two first sliding rails 25 are spaced apart from each other in the width direction of the chassis 12 (for example, the left and right direction illustrated in FIG. 14). The space between the two first sliding rails 25 is configured as the wiring space 123, and connection wires in the window air conditioner 100 may be routed in the wiring space 123. Thus, through the above arrangements, the inner space of the chassis 12 is compact, and also is convenient for the routing and fixing of the connection wires.

It should be noted that the design form and number of the first sliding rail 25 are not limited to this. For example, one first sliding rail 25 may also be arranged on the chassis 12. One side wall of the casing 1 is closely fitted with the inner peripheral wall of the window opening 201, and the first sliding member 26 is fitted with the other side wall of the window opening 201. Furthermore, the first sliding rail 25 may be configured as a cylindrical shell structure, and the first sliding member 26 may also have a cylindrical shape. The design form and number of the first sliding rail 25 may be selected and set according to the actual mounting requirement, which is not limited in the present disclosure.

In some embodiments of the present disclosure, the outer surface of the sealing device 2 may be provided with a flexible first sealing member, and a part of the bottom wall of the window sash 300 may abut against the first sealing member, thereby improving the sealing effect between the window sash 300 and the window air conditioner 100. Specifically, when the window air conditioner 100 is mounted, the window sash 300 may move up and down, and the part of the bottom wall of the window sash 300 may abut against a top surface of the sealing device 2. Since the first sealing member may be flexible part, the first sealing member arranged on the top surface of the sealing device 2 may be closely fitted with the bottom wall of the window sash 300, and the first sealing member arranged at the bottom surface of the sealing device 2 allows the fit between the sealing device 2 and the inner wall of the window opening 201 to be close. Thus, the fit among the window sash 300, the sealing device 2 and the window opening 201 is close and hence provides a great sealing effect.

Optionally, the first sealing member may be made of soft materials such as sponge, silica gel or rubber. Optionally, the first sealing member may be arranged only to the top surface of the sealing device 2, or only to the bottom surface of the sealing device 2, or to the top surface and the bottom surface of the sealing device 2 at the same time, which may be selected and set according to the actual usage requirement, and is not limited herein.

Optionally, the first sealing member may be connected to the sealing device 2 by means of adhering and fixing through adhesives. For example, the first sealing member may be a silicone sheet, and a layer of glue may be coated on a bottom of the first sealing member, such that the first sealing member may be connected with the inner wall of the receiving groove 111 by means of adhering and fixing.

In some embodiments of the present disclosure, the first sliding member 26 may be a hollow part, and a member made of thermal insulation materials may be filled in the first sliding member 26, thereby improving the sealing effect of the sealing device 2. It may be understood that, the thermal insulation materials may have a function of insulating a temperature transmission, thus solving the problem of the cold air leakage in the window air conditioner 100.

In some specific embodiments of the present disclosure, as illustrated in FIGS. 12-13, the window air conditioner 100 includes the casing 1 and the sealing device 2. The casing 1 includes the cabinet 11 and the chassis 12. The cabinet 11 is provided with a receiving groove 111 recessed downwards, and a second sealing member made of silica gel materials is arranged on the bottom wall of the receiving groove 111. As illustrated in FIG. 14, the sealing device 2 includes the first sliding rail 25 and the first sliding member 26, and the first sliding rail 25 is slidably fitted with the first sliding member 26. Two first sliding rails 25 are provided, and configured as a rectangular shell structure, respectively. Each first sliding rail 25 is provided with the first sliding member 26 therein and the first sliding member 26 is configured to slide along the left and right direction. The two first sliding rails 25 are spaced apart from each other in the width direction of chassis 12 (for example, the left and right direction illustrated in FIG. 14). The space between the two first sliding rails 25 is configured as the wiring space 123, and the connection wires in the window air conditioner 100 may be routed in the wiring space 123. The first sliding member 26 is a hollow rectangular structure, and the first sliding member 26 is filled with thermal insulation materials.

Specifically, the sealing device 2 has a retracted state and a sealed state. When the window air conditioner 100 is in transit, the sealing device 2 may be in the retracted state, and the first sliding member 26 may be received in the first sliding rail 25, thereby reducing the occupied volume of the sealing device 2. When the window air conditioner 100 is assembled in the window opening 201, the sealing device 2 may be adjusted to the sealed state. The first sliding member 26 may slide outwards relative to the first sliding rail 25 (in a direction running away from the cabinet 11) and contact with the lower end of the window sash 300 to seal the gap between the window sash 300 and the window opening 201, thereby improving the sealing effect of the sealing device 2.

The length of the sealing device 2 is adjustable. When the distance between the casing 1 and the window opening 201 increases, the first sliding member 26 may be pulled outwards (in a direction running away from the casing 1). When the distance between the casing 1 and the window opening 201 decreases, the first sliding member 26 may be moved inwards (in a direction approaching the casing 1). Thus, through the above arrangements, the sealing device 2 is suitable for different mounting occasions, and the operation is convenient.

Figure 16:
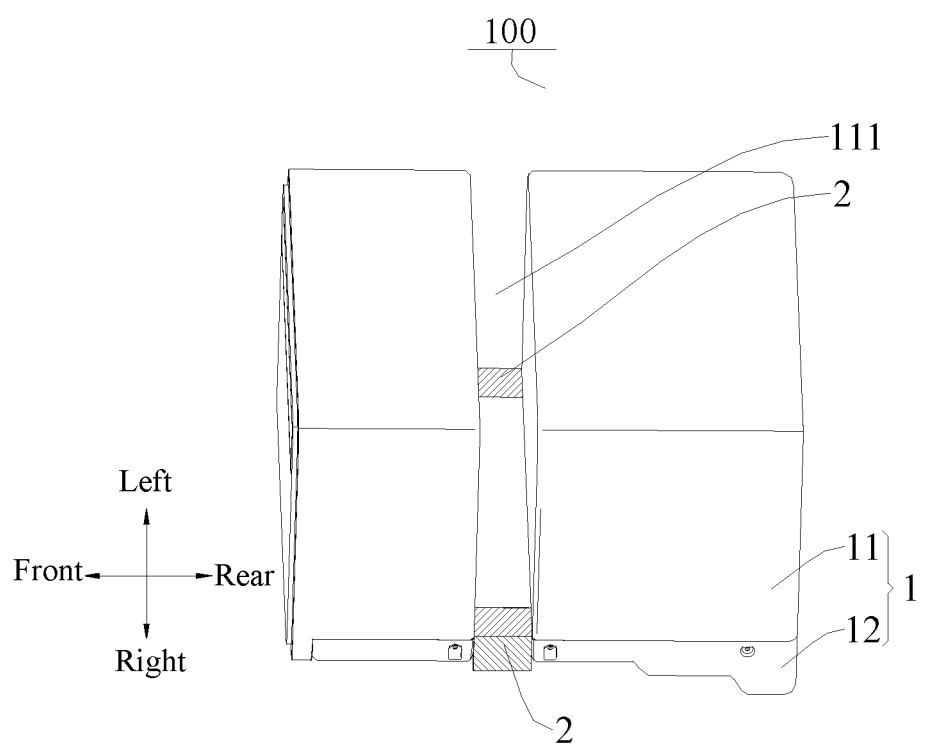
FIG. 16 is a schematic view illustrating an assembled state of a sealing device and a casing according to a fourth embodiment of the present disclosure, in which the sealing device is in a retracted state.

With reference to FIGS. 15-16, a window air conditioner 100 according to a fourth embodiment of the present disclosure will be described as follows.

As illustrated in FIG. 15, according to some embodiments of the present disclosure, the sealing device 2 may include a telescopic member 27 and a sealing plate 28. One end of the telescopic member 27 may be telescopically connected with the casing 1, and the sealing plate 28 may be connected with the other end of the telescopic member 27. In the sealed state, the telescopic member 27 may be stretched and the sealing plate 28 may be closely fitted with the inner wall of the window opening 201. In the retracted state, the telescopic member 27 may be retracted and the sealing plate 28 is received in the receiving groove 111. Thus, the structure of the sealing device 2 is simplified and the operation is convenient through the above arrangements.

Optionally, the telescopic member 27 may be a plastic part. The plastic part has good plasticity and is easy to stretch and retract. Moreover, the manufacturing cost of the plastic part is low, such that the processing cost of the sealing device 2 can be reduced. Optionally, the sealing plate 28 may be a part made of flexible materials such as silica gel or rubber. The part made of flexible materials may be elastically deformed when being fitted with the inner wall of the window opening 201, which allows the fit of the sealing plate 28 and the window opening 201 to be close, thus improving the sealing effect.

Of course, the sealing plate 28 may also be a metal part. For example, the sealing plate 28 may be a sheet metal part. An adhesive layer may be provided on a side surface of the sealing plate 28 close to the window frame 301. In the sealed state, the sealing plate 28 may be hermetically fitted with the window frame 301 through the adhesive layer, thus not only making the fit between the sealing plate 28 and the window opening 201 close, but also having a positioning effect to the telescopic member 27, so as to prevent the telescopic member 27 from rebounding in the sealed state and hence ensure the sealing effect of the sealing device 2.

Optionally, when the sealing device 2 is in the retracted state, the sealing device 2 may be received in the receiving groove 111, or the sealing device 2 may also be received in the casing 1. For example, an accommodating groove may be formed in a side wall of the chassis 12. When the sealing device 2 is in the retracted state, the sealing device 2 may be received in the accommodating groove.

According to some embodiments of the present disclosure, a flexible second sealing member may be arranged on the inner wall of the receiving groove 111, and a part of the bottom wall of the window sash 300 may abut against the second sealing member, thereby improving the sealing effect between the window sash 300 and the sealing device 2. Specifically, when the window air conditioner 100 is mounted, the window sash 300 may move downwards, and the part of the bottom wall of the window sash 300 may abut against the bottom wall of the receiving groove 111. Since the second sealing member may be a flexible part, the second sealing member may be hermetically fitted with the bottom wall of the window sash 300, such that the fit between the window sash 300 and the inner wall of the receiving groove 111 is close. Optionally, the second sealing member may be made of soft materials such as sponge, silica gel, rubber.

In some embodiments of the present disclosure, the second sealing member may be provided with a positioning pin, and a positioning hole configured to be fitted with a latching groove may be formed in the inner wall of the receiving groove 111, thereby simplifying the fixing manner of the second sealing member. For example, a plurality of positioning pins may be arranged at the bottom of the first sealing member, and a plurality of positioning holes may be formed in the top surface of the sealing device 2. When the first sealing member is assembled with the sealing device 2, each positioning pin may be inserted into the corresponding positioning hole, and thus the first sealing member may be fixed to the sealing device 2. Of course, the fixing manner of the second sealing member is not unique. For example, the second sealing member may also be fixed to the inner wall of the receiving groove 111 by means of adhering and fixing through adhesives.

With reference to FIGS. 1 and 17-29, a sealing device 2 according to some other embodiments of the present disclosure will described as follows, and the sealing device 2 may be used in a window air conditioner 100. The window air conditioner 100 may be mounted in a window opening 201 of a wall 200, and a movable window sash 300 is provided in the window opening 201.

Figure 17:
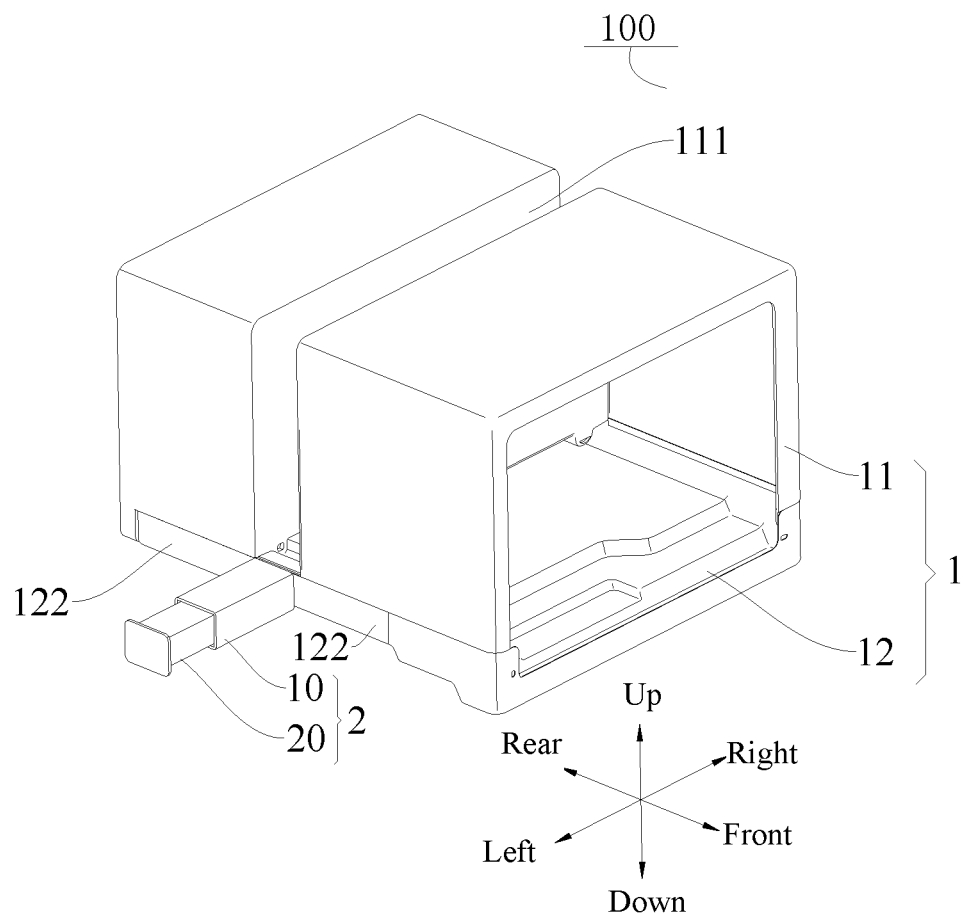
FIG. 17 is a schematic view illustrating a fit structure of a sealing device and a window air conditioner according to some embodiments of the present disclosure.

As illustrated in FIGS. 1 and 17, the window air conditioner 100 according to the embodiments of the present disclosure may include a casing 1 and a sealing device 2.

The casing 1 may include a cabinet 11 and a chassis 12. An outer peripheral wall of the cabinet 11 may be provided with a receiving groove 111 recessed downwards, and at least a part of the window sash 300 may extend into the receiving groove 111. The chassis 12 may be disposed at the bottom of the cabinet 11 and arranged on the window frame 301 of the wall 200, and an end of the sealing device 2 may be connected with the casing 1. Specifically, when the window air conditioner 100 is mounted, the window air conditioner 100 may be arranged in the window opening 201. The window sash 300 may move up and down relative to the wall 200.

When moving downwards, the window sash 300 may extend into the receiving groove 111 in the cabinet 11. Thus, the indoor part and the outdoor part of the window air conditioner 100 may be separated from each other. The sealing device 2 may be configured to seal a gap between the window sash 300 and the window opening 201, thereby improving a sealing effect to an indoor space, and hence improving the cooling and heating effects of the window air conditioner 100.

Optionally, the sealing device 2 may have a detachable connection with the casing 1. The sealing device 2 may be configured to have different models. The different models of the sealing devices 2 may have different lengths and heights. Thus, an appropriate sealing device 2 may be selected according to a distance between the casing 1 and the window opening 201 and a height difference between a bottom wall of the receiving groove 111 and the inner wall of the window opening 201, so as to improve the applicability of the sealing device 2, thus resulting in a close fit structure between the sealing device 2 and the window opening 201 and hence providing a good sealing effect.

As illustrated in FIGS. 18 to 21, the sealing device 2 according to the embodiments of the present disclosure includes a fixing member 10 and a second sliding member 20.

Figure 29:
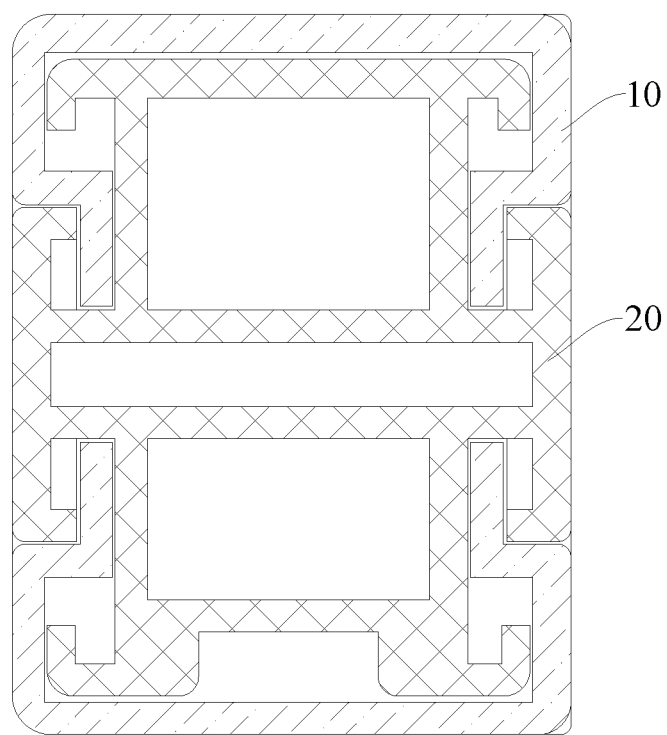
FIG. 29 is a sectional view taken along a line D-D in FIG. 28.
Figure 30:
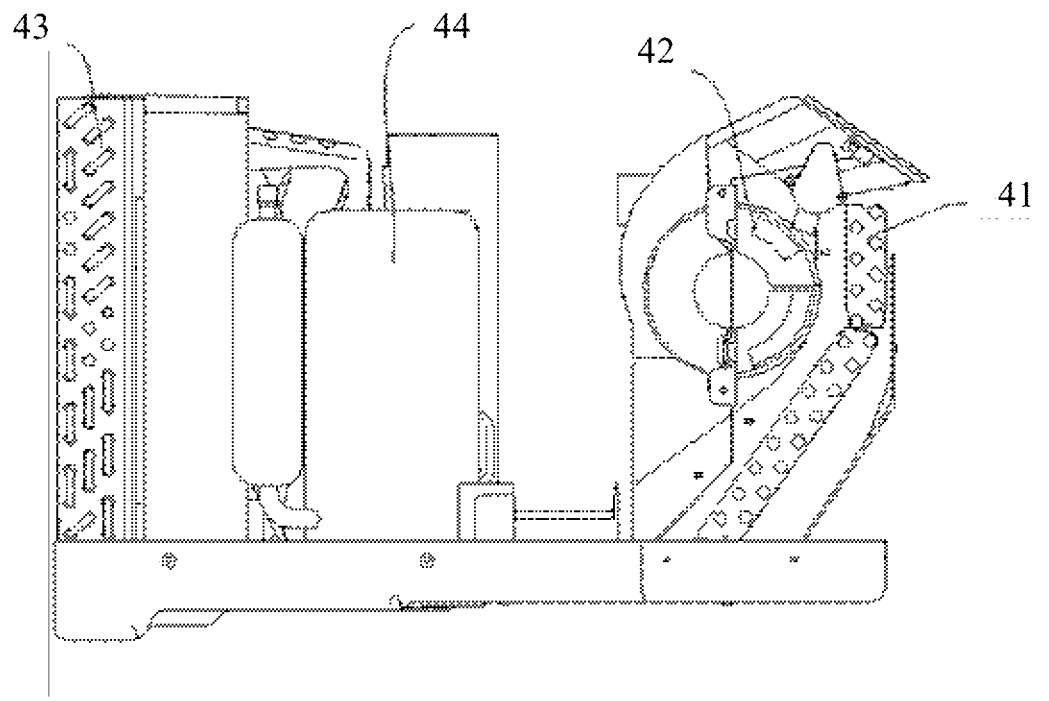
FIG. 30 is a schematic view illustrating a structure inside a casing of an example window air conditioner.

As illustrated in FIG. 29, the fixing member 10 may be connected with the casing 1 of the window air conditioner 100, and the second sliding member 20 may be slidably fitted with the fixing member 10. The second sliding member 20 may have a first position and a second position. In the first position, the second sliding member 20 may overlap the fixing member 10. In the second position, the second sliding member 20 may slide out of the fixing member 10 and have a contact with the window opening 201. The fixing member 10 and the second sliding member 20 may have a contact with the window sash 300 respectively, so as to seal a gap between the window sash 300 and the window opening 201.

It may be understood that, when the window air conditioner 100 is mounted, there is a gap between the window sash 300 and the window opening 201. If the gap is not sealed, the window air conditioner 100 tends to have a cold air leakage, thus affecting the cooling and heating efficiencies of the window air conditioner 100. The sealing device 2 may be configured to seal the gap between the window sash 300 and the window opening 201, thereby preventing the cold air leakage of the window air conditioner 100 and hence improving the cooling and heating efficiencies of the window air conditioner 100.

Specifically, an end of the fixing member 10 may be fixedly connected with the casing 1 of the window air conditioner 100, and the second sliding member 20 may slide with respect to the fixing member 10, so as to adjust a length of the sealing device 2. When the sealing device 2 is in transit, the second sliding member 20 may be in the first position. In this case, the second sliding member 20 and the fixing member 10 are overlapped, so as to reduce the occupied volume of the sealing device 2, thus facilitating the carriage of the sealing device 2. When the sealing device 2 is in operation, the second sliding member 20 may be moved to the second position. In this case, the second sliding member 20 and the fixing member 10 may be closely fitted with the inner wall of the window opening 201, respectively, so as to seal the gap between the window opening 201 and the window sash 300.

Optionally, when the second sliding member 20 is in the second position, a sliding distance of the second sliding member 20 with respect to the fixing member 10 may be selected and set according to an actual requirement. For example, when a distance between an outer peripheral wall of the casing 1 of the window air conditioner 100 and the inner wall of the window opening 201 is large, an extension distance of the second sliding member 20 may be prolonged. When the distance between the outer peripheral wall of the casing 1 of the window air conditioner 100 and the inner wall of the window opening 201 is small, the extension distance of the second sliding member 20 may be shortened. Thus, through the above arrangements, a usage flexibility may be improved for the user, and the sealing device 2 may be suitable for different types of window openings 201, so as to improve the sealing effect of the sealing device 2.

Optionally, the sealing device 2 may be a non-metallic part, which has advantages of a light weight as well as convenient mounting and dismounting. For example, the sealing device 12 may be made of non-metallic materials such as plastics, rubber and silica gel. Of course, the sealing device 2 may also be a metal part, which has advantages of a firm structure and a long service life. For example, the sealing device 2 may be a sheet metal part.

In the sealing device 2 according to the embodiment of the present disclosure, by arranging the fixing member 10 and the second sliding member 20, the second sliding member 20 may slide relative to the fixing member 10 so as to seal the gap between the window sash 300 and the window opening 201, thereby providing a good sealing effect. The sealing device 2 has a simple structure and is convenient to operate, and also is suitable for different models of window openings 201, thus greatly improving the usage flexibility for the user.

Figure 18:
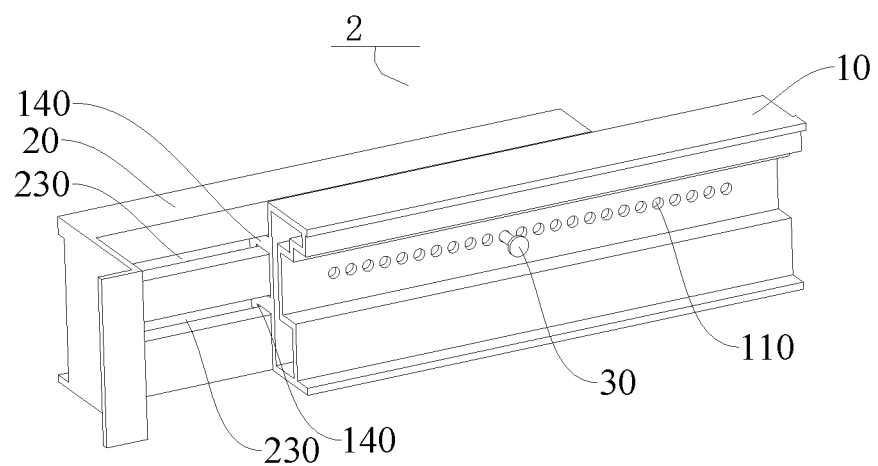
FIG. 18 is a schematic view of a sealing device according to a fifth embodiment of the present disclosure.
Figure 19:
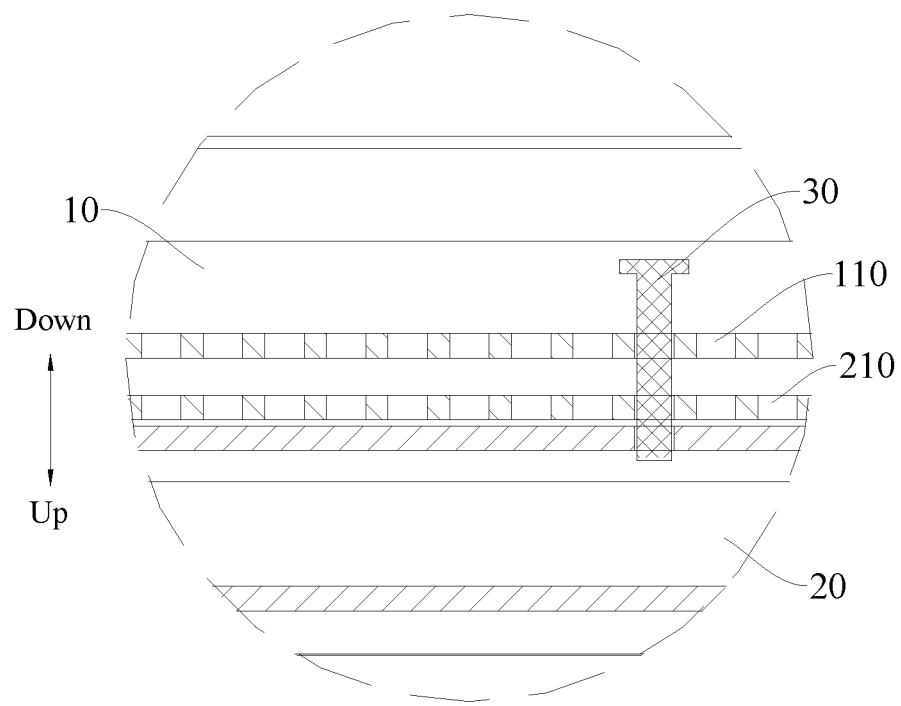
FIG. 19 is a schematic view illustrating a fit state of a positioning member with a fixing member and a sliding member according to a fifth embodiment of the present disclosure.

As illustrated in FIGS. 18-19, according to some embodiments of the present disclosure, the sealing device 2 may also include a positioning member 33, the fixing member 10 is provided with a plurality of first positioning holes 110 spaced apart from one another and the second sliding member 20 is provided with a plurality of second positioning holes 210 right opposite to the first positioning holes 110. In the second position, the positioning member 33 may pass through the first positioning hole 110 to be fitted with the second positioning hole 210 so as to position the second sliding member 20, thus improving the sealing effect of the sealing device 2.

Specifically, the positioning member 30 may position the second sliding member 20. When the second sliding member 20 is in the second position, the positioning member 30 may prevent the second sliding member 20 from moving relative to the window opening 201, thus ensuring that the second sliding member 20 is closely fitted with the inner wall of the window opening 201. In the specific example illustrated in FIG. 19, the fixing member 10 is provided with a plurality of first positioning holes 110 running through the fixing member 10 along an up and down direction, and the second sliding member 20 is provided with a plurality of second positioning holes 210 running through the second sliding member 20 along the up and down direction. A distance between two adjacent first positioning holes 110 is the same with that between two adjacent second positioning holes 210. Thus, the first positioning hole 110 may be easily aligned with the second positioning hole 210 through the above arrangements, thereby ensuring that the positioning member 30 can be smoothly inserted into the first positioning hole 110 and the second positioning hole 210. Optionally, the positioning member 30 may be a positioning pin, which is easy to process and has a low cost, thus reducing a usage cost of the sealing device 2.

Figure 20:
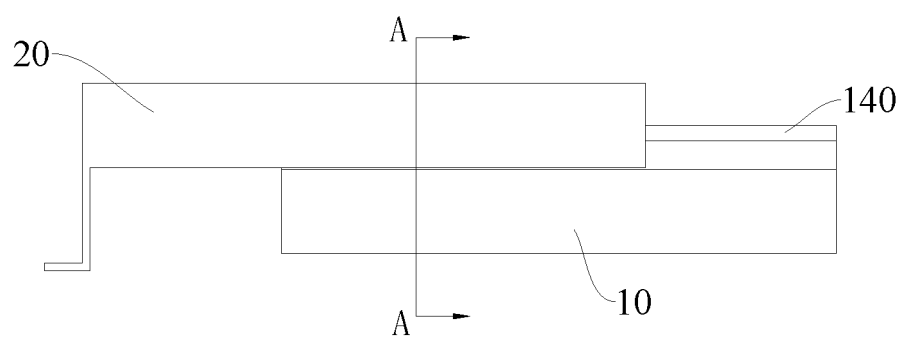
FIG. 20 is a front view of a sealing device according to a fifth embodiment of the present disclosure.
Figure 21:
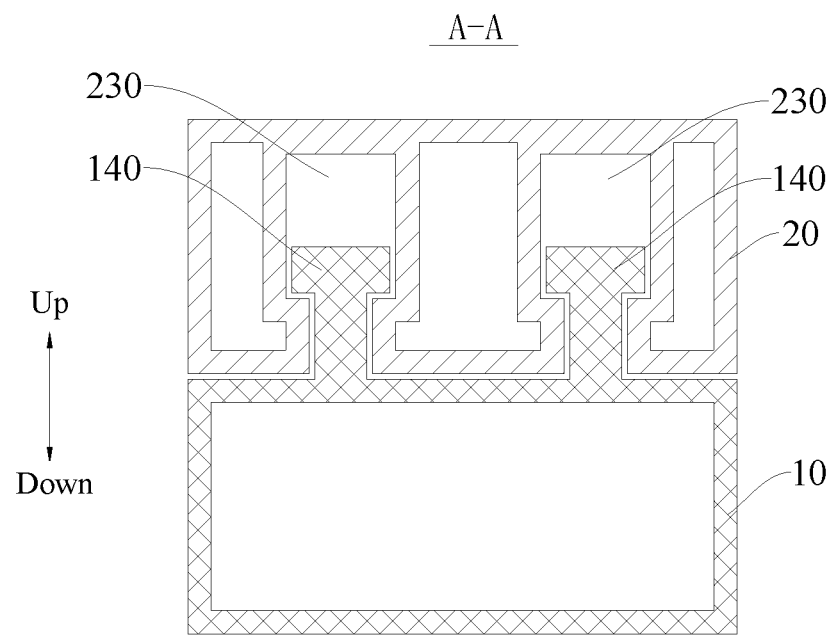
FIG. 21 is a sectional view taken along a line A-A in FIG. 20.

As illustrated in FIGS. 20-21, according to some embodiments of the present disclosure, one of the fixing member 10 and the second sliding member 20 is provided with a second sliding rail 140, and the other one of the fixing member 10 and the second sliding member 20 is provided with a sliding groove 230 slidably fitted with the second sliding rail 140. That is, the second sliding rail 140 may be arranged at the fixing member 10, and the sliding groove 230 may be formed in the second sliding member 20. Or, the sliding groove 230 may be formed in the fixing member 10, and the second sliding rail 140 may be arranged at the second sliding member 20. The second sliding rail 140 may be slidably fitted with the sliding groove 230, thereby allowing the fit between the fixing member 10 and the second sliding member 20 to be smooth.

For example, as illustrated in FIG. 21, a part of an upper end of the fixing member 10 extends upwards to form two second sliding rails 140 spaced apart from each other, and two sliding grooves 230 spaced apart from each other are formed in a bottom of the second sliding member 20. When the second sliding member 20 is assembled with the fixing member 10, each second sliding rail 140 may be extended into the corresponding sliding groove 230. When the second sliding member 20 extends outwards, the second sliding rail 140 is slidably fitted with the sliding groove 230. Optionally, a lubricating oil may be added in the sliding groove 230, so as to allow the fit between the second sliding rail 140 and the sliding groove 230 to be smooth. Optionally, an adhesive layer may be arranged at an end face of the second sliding member 20 close to the window opening 201. In the second position, the second sliding member 20 may be hermetically fitted with the inner wall of the window opening 201 through the adhesive layer, thereby allowing the connection structure between the sealing device 2 and the window opening 201 to be firm.

Figure 22:
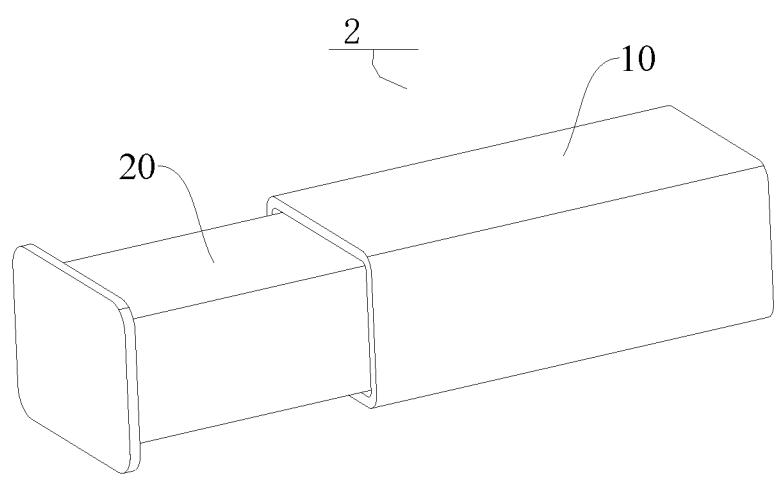
FIG. 22 is a schematic view of a sealing device according to a sixth embodiment of the present disclosure.
Figure 23:
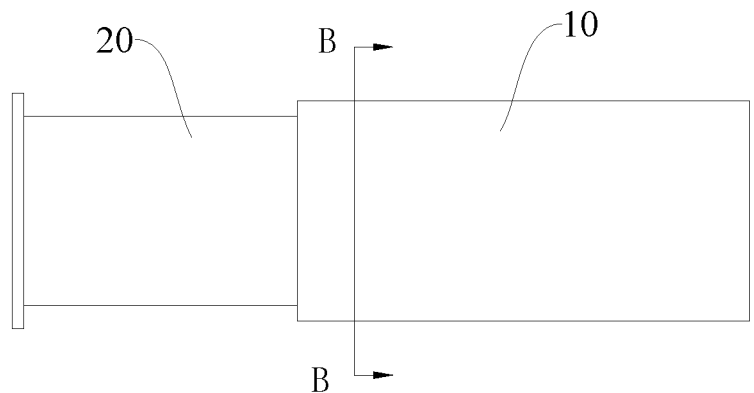
FIG. 23 is a front view of the sealing device illustrated in FIG. 22.
Figure 24:
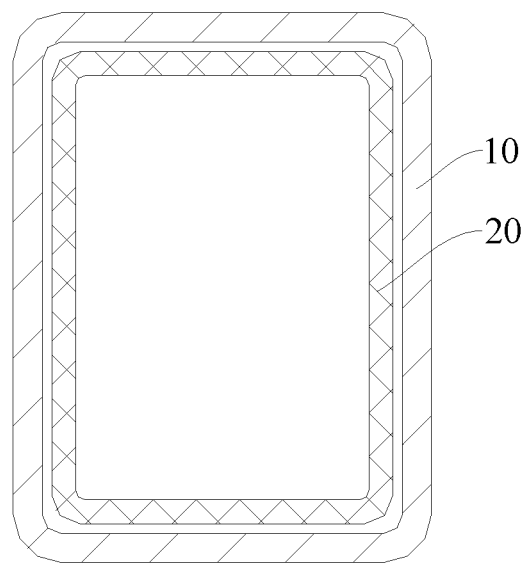
FIG. 24 is a sectional view taken along a line B-B in FIG. 23.

As illustrated in FIGS. 22-24, according to some embodiments of the present disclosure, the fixing member 10 may be sleeved over the second sliding member 20. In the first position, the second sliding member 20 may be received in the fixing member 10, thereby simplifying the fit manner of the fixing member 10 and the second sliding member 20. Optionally, both the fixing member 10 and the second sliding member 20 may be configured as hollow parts, and at least one of the fixing member 10 and the second sliding member 20 may be provided with a thermal insulation layer. That is, the thermal insulation layer may be arranged only to the inner wall of the fixing member 10, or only to the inner wall of the second sliding member 20, or to the inner walls of both the fixing member 10 and the second sliding member 20 at the same time, thereby improving the thermal insulation effect of the sealing device 2. Furthermore, the thermal insulation layer may be made of rubber materials or foam materials.

Figure 25:
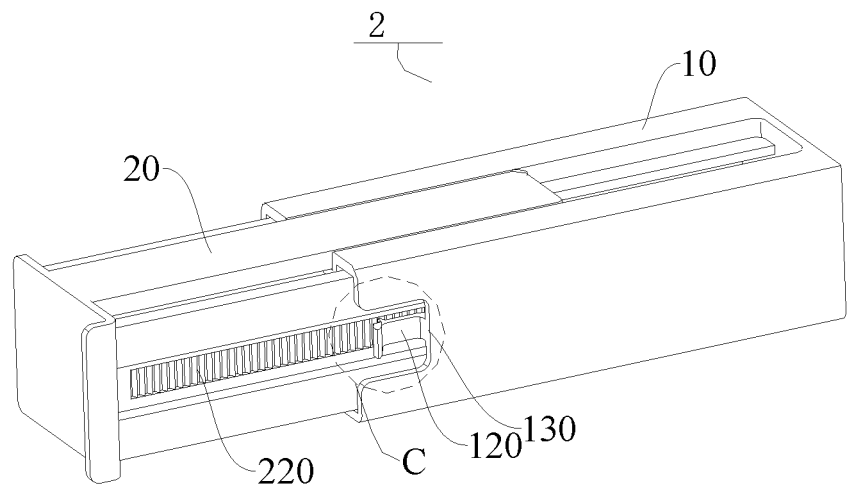
FIG. 25 is a schematic view of a sealing device according to a seventh embodiment of the present disclosure.
Figure 26:
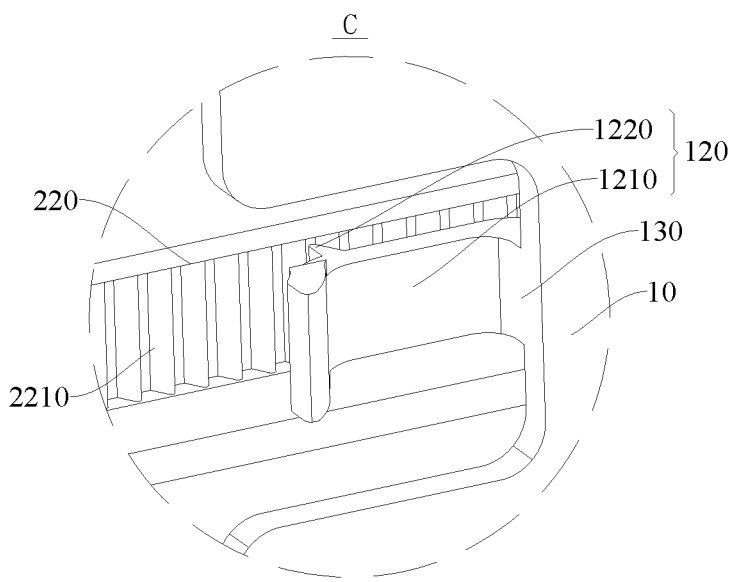
FIG. 26 is a partially enlarged view of a circled portion C in FIG. 25.

As illustrated in FIGS. 25-26, according to some embodiments of the present disclosure, one of the fixing member 10 and the second sliding member 20 may be provided with a positioning part 120, and the other one of the fixing member 10 and the second sliding member 20 may be provided with a latching part 220 fitted with the positioning part 120. The positioning part 120 may have a deformed state and a positioned state, and the latching part 220 may have a plurality of latching grooves 2210 spaced apart from one another along a length direction of the latching part 220. In the positioned state, at least a part of the positioning part 120 may be extended into the latching groove 2210 to only restrict a degree of freedom of a movement of the second sliding member 20 in a direction approaching the fixing member 10. In the deformed state, the positioning part 120 may be separated from the latching groove 2210. Thus, the fit between the fixing member 10 and the second sliding member 20 may be firm, and the sealing effect of the sealing device 2 can also be improved.

Specifically, the positioning part 120 may be arranged at the fixing member 10, and the latching part 220 may be arranged at the second sliding member 20. Or, the latching part 220 may be arranged at the fixing member 10, and the positioning part 120 may be arranged at the second sliding member 20. When the positioning part 120 is in the positioned state, the positioning part 120 always extends into the latching groove 2210 in the latching part 220, and the second sliding member 20 may slide freely in a direction running away from the fixing member 10. When the second sliding member 20 slides in the direction approaching the fixing member 10, the positioning part 120 may abut against an inner peripheral wall of the latching groove 2210, thereby preventing the second sliding member 20 located in the second position from sliding in the direction approaching the fixing member 10, and ensuring that the second sliding member 20 is closely fitted with the inner wall of the window opening 201. When the distance between the window air conditioner 100 and the window opening 201 decreases, the positioning part 120 may be in the deformed state and the positioning part 120 may be separated from the latching groove 2210, such that the positioning part 120 may slide freely.

Figure 27:
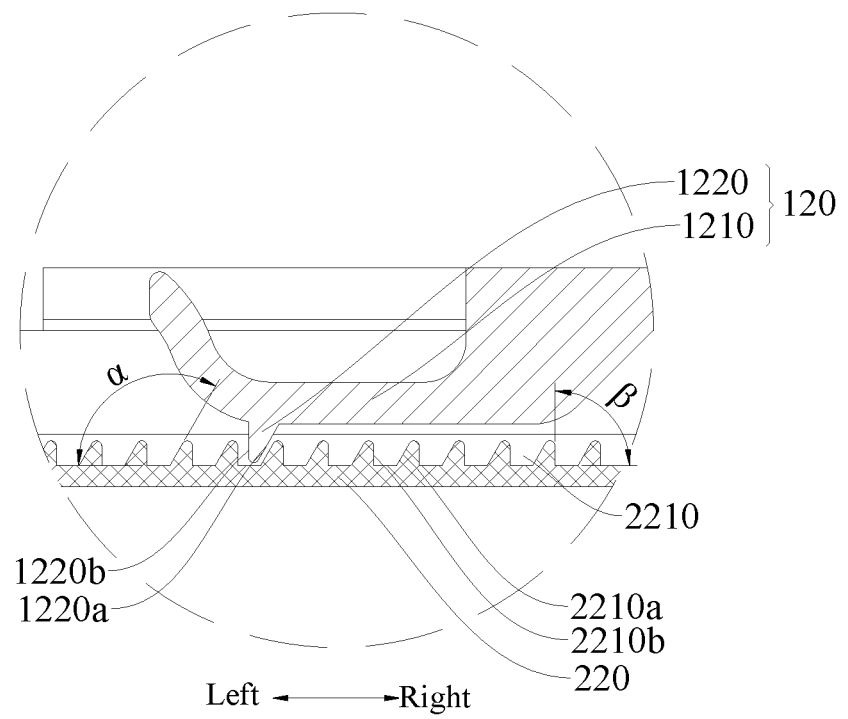
FIG. 27 is a schematic view illustrating a fit state between a positioning part and a latching part according to embodiments of the present disclosure.

As illustrated in FIG. 27, in some embodiments of the present disclosure, the positioning part 120 may have a first inclined surface 1220a and a second inclined surface 1220b. An included angle $\alpha$ between the first inclined surface 1220a and a reference plane is larger than 90 degrees, and an included angle $\beta$ between the second inclined surface 1220b and the reference plane is equal to 90 degrees. The reference plane may be a horizontal plane parallel to an extension direction of the latching part 220. Each latching groove 2210 may have a third inclined surface 2210a and a fourth inclined surface 2210b. The third inclined surface 2210a may be arranged parallel to the first inclined surface 1220a, and the fourth inclined surface 2210b may be arranged parallel to the second inclined surface 1220b. When the second sliding member 20 moves in the direction running away from the fixing member 10, the first inclined surface 1220a and the third inclined surface 2210a are slidably fitted with each other. When the second sliding member 20 moves in the direction approaching the fixing member 10, the second inclined surface 1220b may abut against the fourth inclined surface 2210b to restrict the movement of the second sliding member 20. Thus, by the above arrangements, the fit manner between the positioning part 120 and the latching part 220 is simple and has a good positioning effect.

For example, as illustrated in FIG. 27, the positioning part 120 includes a connecting arm 1210 and an assembling protrusion 1220. The connecting arm 1210 may be connected with the second sliding member 20 or the fixing member 10, and the assembling protrusion 1220 is connected with the connection arm 1210 and extends into the latching groove 2210. The assembling protrusion 1220 includes the first inclined surface 1220a and the second inclined surface 1220b. The includes angle $\alpha$ between the first inclined surface 1220a and the horizontal plane is equal to 120 degrees, and the included angle $\beta$ between the second inclined surface 1220b and the horizontal plane is equal to 90 degrees. The latching groove 2210 includes the third inclined surface 2210a and the fourth inclined surface 2210b arranged opposite to each other in the left and right direction. The third inclined surface 2210a is arranged parallel to the first inclined surface 1220a, and the fourth inclined surface 2210b is arranged parallel to the second inclined surface 1220b. When the positioning part 120 is in the positioned state, the assembling protrusion 1220 always extends into the latching groove 2210. When the positioning part 120 is in the deformed state, the connecting arm 1210 is elastically deformed, so as to drive the assembling protrusion 1220 to be separated from the latching groove 2210.

As illustrated in FIG. 26, in some embodiments of the present disclosure, one of the fixing member 10 or the second sliding member 20 is provided with an assembling groove 130, and the positioning part 120 may be arranged in the assembling groove 130. The positioning part 120 may be an elastic member, such that the overall structure of the sealing device 2 is compact. For example, the positioning part 120 may be arranged at the fixing member 10, and the fixing member 10 includes the assembling groove 130 for receiving the positioning part 120, thereby allowing the overall structure of the positioning part 120 to be compact. Since the positioning part 120 may be an elastic part, and the elastic part may have an elastic deformation, such that it is convenient for the positioning part 120 to be separated from the latching groove 2210.

Figure 28:
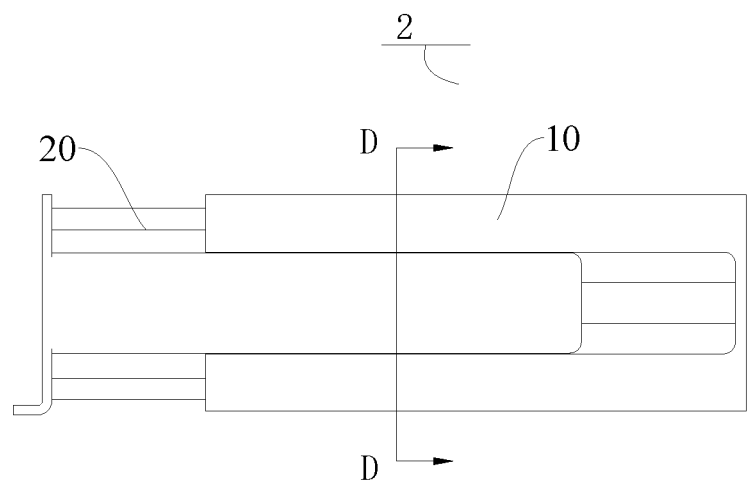
FIG. 28 is a front view of the sealing device illustrated in FIG. 25.

In the specific example illustrated in FIGS. 28-29, the fixing member 10 may be fitted with the second sliding member 20 in a nested manner. The fixing member 10 may include a fit space for the second sliding member 20, and the second sliding member 20 may also include a fit space for the fixing member. Thus, the fixing member 10 and the second sliding member 20 are firmly fitted together. Through the above arrangements, the fit structure of the fixing member 10 and the second sliding member 20 may be firm, and the malposition of the second sliding member 20 may be prevented during the sliding thereof.

According to some embodiments of the present disclosure, the inner wall of the receiving groove 111 may be provided with a flexible second sealing member, and a part of the bottom wall of the window sash 300 may abut against the second sealing member, thereby improving the sealing effect of the window air conditioner 100. Specifically, when the window air conditioner 100 is mounted, the window sash 300 may move downwards, and the part of the bottom wall of the window sash 300 may abut against the bottom wall of the receiving groove 111. Since the second sealing member may be a flexible member, the second sealing member may be hermetically fitted with the bottom wall of the window sash 300, such that the fit between the window sash 300 and the inner wall of the receiving groove 111 is close.

Optionally, the second sealing member may be made of soft materials such as sponge, silica gel, rubber. Optionally, the second sealing member may be connected to the inner wall of the receiving groove 111 by means of adhering and fixing through adhesives, and the second sealing member may also be connected to the inner wall of the receiving groove 111 by means of a positioning-pin connection. For example, the second sealing member may be a silicone sheet, and a layer of glue may be coated on a bottom of the second sealing member, such that the second sealing member is connected with the inner wall of the receiving groove 111 by means of adhering and fixing.

As illustrated in FIG. 17, according to some embodiments of the present disclosure, the sealing device 2 includes a fixing member 10 and a second sliding member 20. The fixing member 10 may be connected with the casing 1 of the window air conditioner 100, and the second sliding member 20 may be slidably fitted with the fixing member 10. The sealing device 2 is rotatable relative to the casing 1. The sealing device 2 may have a retracted state and a sealed state. In the retracted state, the sealing device 2 may be received in the receiving groove 111. In the sealed state, the sealing device 2 may rotate and extend out of the casing 1. Thus, the connection between the sealing device 2 and the casing 1 is flexible and it is convenient for the mounting of the sealing device 2. Specifically, when the window air conditioner 100 is in transit, the sealing device 2 may be in the retracted state, and the sealing device 2 may be received in the receiving groove 111, thereby reducing the occupied volume of the sealing device 2. When the window air conditioner 100 is assembled in the window opening 201, the sealing device 2 may be adjusted to the sealed state. The sealing device 2 may be extended outwards relative to the casing 1 and closely fitted with the inner wall of the window opening 201, thus providing a good sealing effect.

As illustrated in FIG. 17, according to some embodiments of the present disclosure, the sealing device 2 includes a fixing member 10 and a second sliding member 20. The fixing member 10 may be connected with the casing 1 of the window air conditioner 100, and the second sliding member 20 may be slidably fitted with the fixing member 10. The sealing device 2 is rotatable relative to the casing 1. The chassis 12 may be provided with an accommodating groove 122. The sealing device 2 may have a sealed state and a retracted state. In the retracted state, the sealing device 2 may be received in the accommodating groove 122. In the sealed state, the sealing device 2 may rotate and extend out of the casing 1, such that the connection between the sealing device 2 and the casing 1 is flexible and it is convenient for the mounting of the sealing device 2.

For example, as illustrated in FIG. 17, two accommodating grooves 122 are provided in the side wall of the chassis 12, and the two accommodating grooves 122 are spaced apart from each other by the receiving groove 111 in the casing 1. One of the accommodating grooves 122 is arranged in front of the receiving groove 111 and the other one of the accommodating grooves 122 is arranged in rear of the receiving groove 111. When the sealing device 2 is in the retracted state, the sealing device 2 may be received in one of the accommodating grooves 122, which may be selected and set according to actual usage requirements.

In some specific embodiments of the present disclosure, as illustrated in FIGS. 1 and 17, the window air conditioner 100 includes a casing 1 and a sealing device 2. The casing 1 includes a cabinet 11 and a chassis 12. An outer peripheral wall of the cabinet 11 is provided with a receiving groove 111 recessed downwards, and a second sealing member made of silica gel material is arranged on a bottom wall of the receiving groove 111. A side wall of the chassis 12 is provided with two accommodating grooves 122, and the two accommodating grooves 122 are spaced apart from each other by the receiving groove 111 in casing 1. One of the accommodating grooves 122 is arranged in front of the receiving groove 111 and the other one of the accommodating grooves 122 is arranged in rear of the receiving groove 111. Left and right ends of the casing 1 are provided with the sealing device 2, respectively, and the sealing device 2 is rotatably connected with the casing 1.

As illustrated in FIGS. 25-27, the sealing device 2 includes a fixing member 10 and a second sliding member 20. The fixing member 10 may be connected with the casing 1, and the second sliding member 20 may be slidably fitted with the fixing member 10. The fixing member 10 is provided with a positioning part 120, and the second sliding member 20 is provided with a latching part 220 fitted with the positioning part 120. The latching part 220 has a plurality of latching grooves 2210 spaced apart from one another along a length direction of the latching part 220.

As illustrated in FIG. 27, the positioning part 120 includes a connecting arm 1210 and an assembling protrusion 1220. The connecting arm 1210 is connected with the fixing member 10, and the assembling protrusion 1220 is connected with the connection arm 1210 and extends into the latching groove 2210. The assembling protrusion 1220 has a first inclined surface 1220a and a second inclined surface 1220b. An included angle α between the first inclined surface 1220a and the horizontal plane is equal to 120 degrees, and an included angle β between the second inclined surface 1220b and the horizontal plane is equal to 90 degrees. The latching groove 2210 has a third inclined surface 2210a and a fourth inclined surface 2210b arranged opposite to each other in the left and right direction. The third inclined surface 2210a is arranged parallel to the first inclined surface 1220a, and the fourth inclined surface 2210b is arranged parallel to the second inclined surface 1220b.

The positioning part 120 has a deformed state and a positioned state. When the positioning part 120 is in the positioned state, the assembling protrusion 1220 extends into the latching groove 2210. When the second sliding member 20 moves in a direction running away from the fixing member 10, the first inclined surface 1220a and the third inclined surface 2210a are slidably fitted with each other. When the second sliding member 20 moves in a direction approaching the fixing member 10, the second inclined surface 1220b abuts against the fourth inclined surface 2210b to restrict the second sliding member 20 from moving. When the positioning part 120 is in the deformed state, the connecting arm 1210 has an elastic deformation, so as to drive the assembling protrusion 1220 to be separated from the latching groove 2210, and thus the second sliding member 20 can slide freely in the left and right direction.

The sealing device 2 has a sealed state and a retracted state. When the sealing device 2 is in the retracted state, the sealing device 2 may be received in the receiving groove 111, or the sealing device 2 may also be received in one of the accommodating grooves 122. When the sealing device 2 is in the sealed state, first, the sealing device 2 rotates relative to the casing 1 to a position where the sealing device 2 is parallel to the horizontal plane of the window frame 301. Then, the second sliding member 20 slides outwards relative to the fixing member 10 and is closely fitted with the inner wall of the window frame 301. The positioning part 120 allows the second sliding member 20 to always keep closely fitted with the window frame 301, thus achieving a good sealing effect.

It is to be understood that in the above description of the present disclosure that terms such as "center", "length", "width", "thickness", "top", "bottom", "front", "rear", "left", "right", "top", "bottom", "inside" and "outside" should be construed to refer to the orientation or position relationship based on the orientation or position relationship illustrated in the drawings, are only used to describe the present disclosure and simplify description, and do not indicate or imply that the device or element referred to must have a particular orientation or be configured or operate in a specific orientation, which cannot be construed as a limitation to the present disclosure. "A plurality of" means two or more than two.

Reference throughout this specification to terms "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples.

Although embodiments of the present disclosure have been illustrated and described above, it should be understood by those skilled in the art that changes, modifications, alternatives, and variations can be made in the embodiments without departing from spirit, principles and scope of the present disclosure. The scope of the invention is defined by the claims and their equivalents.

What is claimed is:

1. A window air conditioner comprising:
   a casing comprising a cabinet, an outer peripheral wall of the cabinet including a receiving groove recessed downwards to separate the cabinet into an indoor part and an outdoor part;
   an indoor heat exchanger and an indoor fan arranged in the indoor part;
   an outdoor heat exchanger and a compressor arranged in the outdoor part; and
   a sealing device connected with the casing and arranged corresponding to the receiving groove;
   wherein:
   the casing includes a rotating shaft;
   a connecting end of the sealing device includes a hook hooked on the rotating shaft; and
   the sealing device is configured to rotate relative to the rotating shaft.

2. The window air conditioner according to claim 1, wherein the connecting end of the sealing device is rotatably connected with the casing.

3. The window air conditioner according to claim 1, wherein a bottom wall of the receiving groove includes an assembling slot recessed downwards, and the rotating shaft is arranged in the assembling slot.

4. The window air conditioner according to claim 1, wherein:
   the connecting end of the sealing device includes an assembling opening; and
   the casing further includes a chassis disposed at a bottom of the cabinet, an outer peripheral wall of the chassis including a recessed part, and the chassis being configured to at least partially extend into the assembling opening when the sealing device is in the sealed state such that an outer peripheral wall of the recessed part is fitted with an inner peripheral wall of the assembling opening.

5. The window air conditioner according to claim 1, wherein the sealing device is configured to switch between:
   a sealed state in which at least a part of the sealing device is arranged outside the casing, and
   a retracted state in which the sealing device is received in the casing.

6. The window air conditioner according to claim 5, wherein:
   the casing further includes a chassis disposed at a bottom of the cabinet and including a plurality of accommodating grooves formed in a side wall of the chassis; and
   the sealing device is configured to be received in one of the accommodating grooves when the sealing device is in the retracted state.

7. The window air conditioner according to claim 5, wherein the sealing device comprises:
   a rotating part rotatably connected with the casing; and
   a sealing part connected with the rotating part and configured to stretch and retract relative to the rotating part, and the sealing part being configured to extend out of the rotating part when the sealing device is in the sealed state.

8. The window air conditioner according to claim 7, wherein the sealing part is one of a plurality of the sealing parts connected in sequence along a length direction of the rotating part, and two adjacent ones of the sealing parts are movable relative to each other.

9. The window air conditioner according to claim 5, wherein one end of the sealing device is connected with the casing, and another end of the sealing device is movable relative to the casing.

10. The window air conditioner according to claim 9, wherein the sealing device comprises:
a telescopic member, one end of the telescopic member is telescopically connected with the casing; and
a sealing plate connected with another end of the telescopic member;
wherein the telescopic member is configured to:
be extended to push the sealing plate away from the casing when the sealing device is in the sealed state, and
be retracted to allow the sealing plate to be received in the receiving groove.

11. The window air conditioner according to claim 9, wherein the sealing device comprises:
a sliding rail located in the cabinet; and
a sliding member slidably fitted with the first sliding rail and being configured to:
be received in the cabinet when the sealing device is in the retracted state, and
slide outwards relative to the sliding rail when the sealing device is in the sealed state.

12. The window air conditioner according to claim 11, wherein the sliding rail is sleeved over the sliding member, and the sliding member is configured to be received in the sliding rail when the sealing device is in the retracted state.

13. The window air conditioner according to claim 11, wherein the sliding rail is one of two sliding rails of the sealing device that are spaced apart from each other in a width direction of the cabinet.

14. The window air conditioner according to claim 11, wherein the sliding member includes a hollow part, and a thermal insulation material is filled in the sliding member.

15. The window air conditioner according to claim 9, wherein the sealing device comprises:
a fixing member connected with the casing;
a sliding member slidably fitted with the fixing member and configured to slide between:
a first position at which the sliding member overlaps the fixing member, and
a second position at which the second sliding member extends out of the fixing member.

16. The window air conditioner according to claim 15, further comprising:
a positioning member;
wherein:
the fixing member includes a plurality of first positioning holes spaced apart from one another;
the sliding member includes a plurality of second positioning holes opposite to the first positioning holes; and
the positioning member is configured to pass through one of the first positioning holes to be fitted with one of the second positioning holes to position the sliding member when the sliding member is at the second position.

17. The window air conditioner according to claim 15, wherein:
the positioning part has a first surface and a inclined surface, an included angle between the first surface and a reference plane parallel to an extending direction of the latching part is larger than 90 degrees, and an included angle between the second surface and the reference plane is equal to 90 degrees,
each of the latching grooves has a third surface and a fourth surface, the third surface is parallel to the first surface and is configured to slide on the first surface when the sliding member slides in a direction away from the fixing member, and the fourth surface is parallel to the second surface and is configured to abut against the second surface to restrict the movement of the sliding member when the sliding member is pushed in a direction towards the fixing member.

18. The window air conditioner according to claim 15, wherein the fixing member is sleeved over the sliding member, and the second sliding member is configured to be received in the fixing member when at the first position.

19. The window air conditioner according to claim 15, wherein:
one of the fixing member and the sliding member includes a positioning part, and another one of the fixing member and the second sliding member includes a latching part fitted with the positioning part and including a plurality of latching grooves spaced apart from one another along a length direction of the latching part; and
the positioning part has:
a positioned state in which at least a part of the positioning part is extended into one of the latching grooves to restrict a degree of freedom of movement of the sliding member in a direction approaching the fixing member, and
a deformed state in which the positioning part is separated from the latching grooves.

20. The window air conditioner according to claim 19, wherein the one of the fixing member and the sliding member includes an assembling groove, the positioning part is arranged in the assembling groove, and the positioning part is an elastic member.

* * * * *